US008458077B2

(12) United States Patent
Griffin et al.

(10) Patent No.: US 8,458,077 B2
(45) Date of Patent: Jun. 4, 2013

(54) METHOD AND SYSTEM FOR FACILITATING A CONTEXT-BASED ELECTRONIC COMMUNICATION REGARDING A FINANCIAL TRANSACTION

(75) Inventors: Kenneth C. Griffin, Chicago, IL (US); Tom Miglis, Woodbury, NY (US)

(73) Assignee: KCG IP Holdings LLC, Chicago, IL (US)

( * ) Notice: Subject to any disclaimer, the term of this patent is extended or adjusted under 35 U.S.C. 154(b) by 149 days.

(21) Appl. No.: 12/539,440

(22) Filed: Aug. 11, 2009

(65) Prior Publication Data

US 2011/0040661 A1    Feb. 17, 2011

(51) Int. Cl.
*G06Q 40/00*    (2012.01)
*G06F 15/16*    (2006.01)

(52) U.S. Cl.
USPC .............................................. 705/37; 709/206

(58) Field of Classification Search
None
See application file for complete search history.

(56) References Cited

U.S. PATENT DOCUMENTS

| 7,634,546 | B1 * | 12/2009 | Strickholm et al. | 709/207 |
|---|---|---|---|---|
| 7,634,814 | B1 * | 12/2009 | Sobel et al. | 726/25 |
| 7,636,751 | B2 * | 12/2009 | Weaver et al. | 709/204 |
| 7,639,251 | B2 * | 12/2009 | Gu et al. | 345/419 |
| 2001/0034689 | A1 * | 10/2001 | Heilman, Jr. | 705/37 |
| 2001/0042037 | A1 * | 11/2001 | Kam et al. | 705/36 |
| 2005/0108329 | A1 * | 5/2005 | Weaver et al. | 709/204 |
| 2007/0033129 | A1 * | 2/2007 | Coates | 705/36 R |
| 2010/0325221 | A1 * | 12/2010 | Cohen et al. | 709/206 |

* cited by examiner

*Primary Examiner* — Mussa A Shaawat
(74) *Attorney, Agent, or Firm* — Marshall, Gerstein & Borun LLP

(57) ABSTRACT

Method and system providing context-based electronic communication regarding a financial transaction. One system includes a database configured to store data pertaining to a financial transaction involving an investment fund. The system further includes a display application configured to create a display for displaying the financial transaction and one or more transaction parameters. The transaction parameters are based on data pertaining to the financial transaction stored in the database. The system further includes a communication application configured to create a communication interface. The communication interface enables a first user to initiate a communication with a second user regarding the financial transaction. The communication interface further automatically embeds at least a portion of the transaction parameters in the communication displayed to the second user.

20 Claims, 22 Drawing Sheets

FIG. 13

PRICES

| ISSUER | | | | | ACTION | | |
|---|---|---|---|---|---|---|---|
| All ▽ | | | | | | | |

Upload New Pri...

UPLOAD PRICES

| | Legal Entity | Type | Path | | |
|---|---|---|---|---|---|
| 1. | LE1 ▽ | NEW ▽ | <.../priceupload.csv> ▽ | BROWSE | |
| 2. | ▽ | ▽ | ▽ | BROWSE | |
| 3. | ▽ | ▽ | ▽ | BROWSE | |
| 4. | ▽ | ▽ | ▽ | BROWSE | |

[ UPLOAD PRICES ]

[ CANCEL ]   [ OK ]

| SECURITY | | | | | | |
|---|---|---|---|---|---|---|
| + | S1 | Ag... | | | | |
| + | S2 | Cu... | | | | |
| + | S3 | Mi... | | | | |
| + | S4 | Ag... | | | | |
| | . | . | . | . | . | . |

← 1300

SECURITY S5 — 1600

DETAILS | HISTORY

| ⚠ Status: Aging | Security: S5 | Price: P5 | Date: d/m/y |
|---|---|---|---|
| Position: P5 | Market Value: MV | | |
| Source: Mutual Entity | User ID: D1 | Supporting Documentation: <evidence.pdf> | |

Pricing Policy Applicable Rule: Arbitration – if outside of threshold where the client disagrees with the Bloomberg price, the client should provide evidence of their date. Citadel Solutions will follow up with Bloomberg to substantiate their price. The Investment Manager and Citadel Solutions will us reasonable efforts to reach agreement based on evidence.

VIEW PRICING POLICY FOR THIS TYPE OF SECURITY

✎ Edit
- ● Use Existing Price
- ○ Enter New Price

Price: [          ]

Support Documentation: [          ] (Browse)

[ OK ]  [ CANCEL ]

FIG. 16

CASH

| VIEW BY | ACCOUNT | DESK | CURRENCY | UNIT | CASH FLOW |
|---|---|---|---|---|---|
| All ▷ | All ▷ | All ▷ | All ▷ | All ▷ | All ▷ |

| New Account | Email View | Create Report | Customize View |
|---|---|---|---|

| UNIT | ACCOUNT | LAST STATEMENT | CREDIT | DEBIT | BALANCE | STATUS | ACTION |
|---|---|---|---|---|---|---|---|
| | | | | | | | ▷ |
| | | | | | | | ▷ |
| . | . | . | . | . | . | . | |
| . | . | . | . | . | . | . | |
| . | . | . | . | . | . | . | |
| + | + | | | | | | |

METHOD AND SYSTEM FOR FACILITATING A CONTEXT-BASED ELECTRONIC COMMUNICATION REGARDING A FINANCIAL TRANSACTION

TECHNICAL FIELD

The present application relates generally to data management and, more specifically, to a method and system for administering an investment fund.

BACKGROUND

Investment funds are generally professionally managed investment vehicles that hold and manage assets of investors (e.g., individuals, pension funds, companies, and so on). One example of an investment fund is a hedge fund. Hedge funds are typically set up as private investment partnerships, and they generally employ a variety of aggressive investment strategies, such as leveraged, long, short and derivative positions to enhance returns.

Assets of a hedge fund are generally gathered and managed by hedge fund management systems. Specific activities related to hedge fund management may include, but are not limited to calculating the net asset value of the hedge fund; managing risk; maintaining financial books and records of the hedge fund; pricing of assets, and so on. Some or all of these activities may be functions performed by a hedge fund management system.

A number of additional entities, including prime brokers (e.g., investment banks), market data vendors, distributors, and so on may participate in and/or assist with the management of a hedge fund utilizing their own respective systems. Prime brokers may lend securities and cash to the hedge fund for investment on a leveraged basis. Prime brokers may also act as a counterparty to derivative contracts. Market data vendors may offer the hedge fund managers access to trading activity (e.g., on the NASDAQ stock market), e.g., by providing real-time quotations, trade and market summary data, market news, company profiles, and so on. Distributors may assist with marketing the hedge fund to potential investors.

One challenge associated with managing a hedge fund is coordinating the activities of and the communication between the various entities described above and their respective systems. Individuals and systems within the different entities communicated with each other in an ad hoc manner, e.g., via phone, e-mail, etc., partly because the systems of the different entities are different from one another. Such mode of interaction is problematic because it generally lacks transparency; it is relatively time consuming and prone to human errors and oversight; it does not provide a good record of management activities, and so on. Accordingly, it would be desirable have an integrated platform for administering the numerous activities associated with hedge fund management.

SUMMARY

In general, the present disclosure provides techniques for context-based electronic communication regarding a financial transaction. In one embodiment, in order to facilitate a context-based electronic communication, a data integration system is used. The data integration system includes one or more data collectors for collecting various parameters associated with financial transactions and a database for storing the collected parameters. Further, the data integration system includes a display application for displaying a list of transactions and the parameters associated with those transaction.

Still further, the data integration system includes a communication application that allows a user to select a particular transaction and initiate an electronic communication (e.g., instant message, e-mail, and so on) with another user regarding that transaction. When the electronic communication is initiated, certain parameters of the associated transaction are automatically attached to the communication in order to provide the users with the necessary context for the communication. This generally reduces the time spent by the users on setting the context of the communication.

As one example, the data integration system may enable users to communicate with each other regarding an electronic trade via instant messaging (IM), using an IM window that automatically displays to the users parameters of the electronic trade. As a result, users may not be required to exchange that information to set the context for the IM conversation. Furthermore, if desired, the IM window may be configured to provide access to more information about the trade that is not displayed in the IM window.

BRIEF DESCRIPTION OF THE DRAWINGS

FIG. 13 illustrates an example interface embodiment for uploading prices;

FIG. 16 illustrates an example interface for editing the price of a security;

FIG. 19 illustrates an example interface embodiment of a cash view;

DETAILED DESCRIPTION

Although the following text sets forth a detailed description of numerous different embodiments, it should be understood that the legal scope of the description is defined by the words of the claims set forth at the end of this disclosure. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

Much of the disclosed functionality and many of the disclosed principles are best implemented with or in software programs or instructions and integrated circuits (ICs) such as application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. Therefore, in the interest of brevity and minimization of any risk of obscuring the principles and concepts in accordance to the present invention, further discussion of such software and ICs, if any, will be limited to the essentials with respect to the principles and concepts of the preferred embodiments.

Figure 1A:
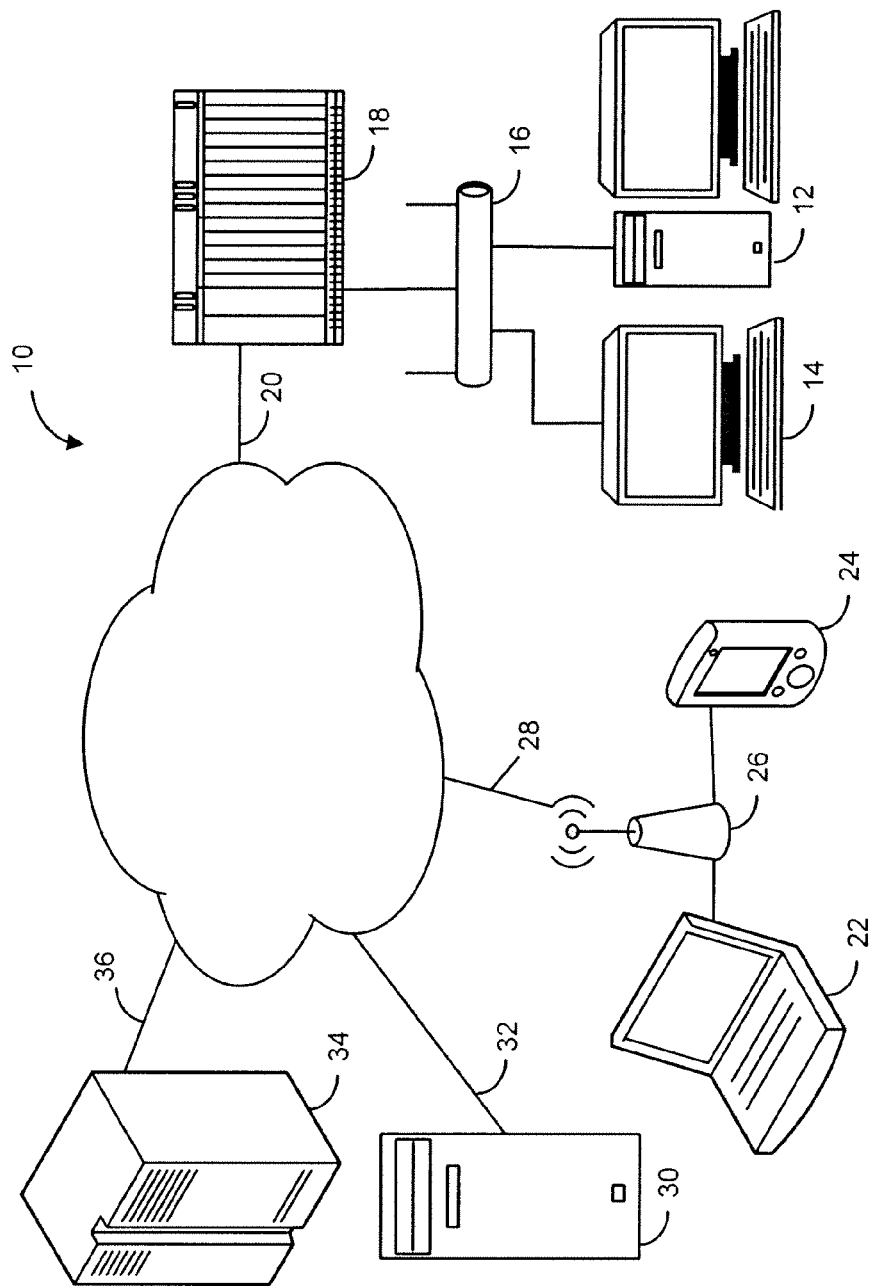
FIG. 1A illustrates an example computer network.
Figure 1B:
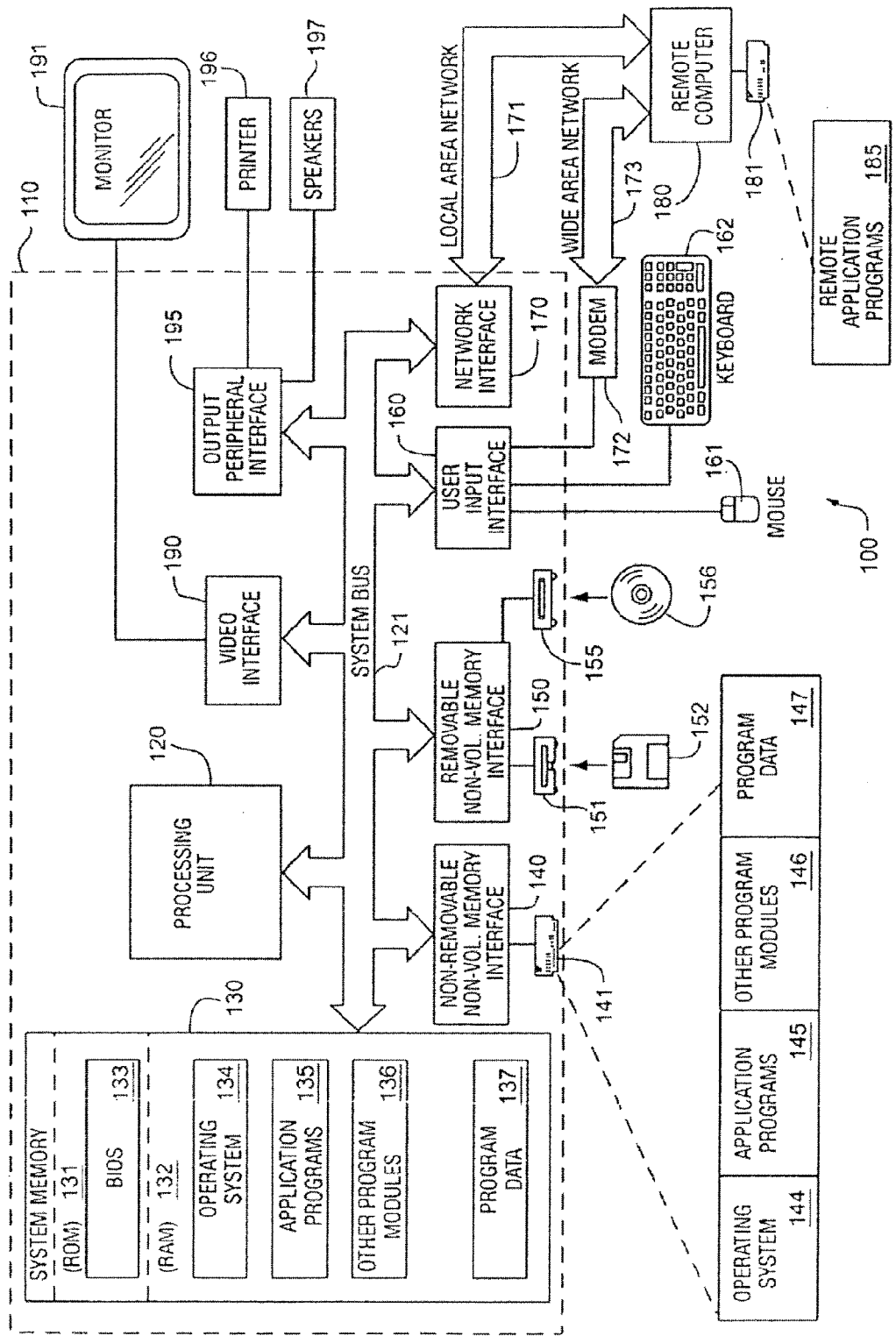
FIG. 1B illustrates an example computer that may be connected to the network of FIG. 1A.

FIGS. 1A-1B provide a structural basis for the network and computational platforms related to the instant disclosure.

FIG. 1A illustrates a network 10. The network 10 may be the Internet, a virtual private network (VPN), or any other network that allows one or more computers, communication devices, databases, etc., to be communicatively connected to each other. The network 10 may be connected to a personal computer 12, and a computer terminal 14 via an Ethernet 16 and a router 18, and a landline 20. The Ethernet 16 may be a subnet of a larger Internet Protocol network. Other networked resources, such as projectors or printers (not depicted), may also be supported via the Ethernet 16 or another data network. On the other hand, the network 10 may be wirelessly connected to a laptop computer 22 and a personal data assistant 24 via a wireless communication station 26 and a wireless link 28. Similarly, a server 30 may be connected to the network 10 using a communication link 32 and a mainframe 34 may be connected to the network 10 using another communication link 36. The network 10 may be useful for supporting peer-to-peer network traffic.

FIG. 1B illustrates a computing device in the form of a computer 110. Components of the computer 110 may include, but are not limited to a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, FLASH memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1B illustrates operating system 134, application programs 135, other program modules 136, and program data 137.

The computer 110 may also include other removable/non-removable, volatile/nonvolatile computer storage media. By way of example only, FIG. 1B illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1B, provide storage of computer readable instructions, data structures, program modules and other data for the computer 110. In FIG. 1B, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and cursor control device 161, commonly referred to as a mouse, trackball or touch pad. A camera 163, such as web camera (webcam), may capture and input pictures of an environment associated with the computer 110, such as providing pictures of users. The webcam 163 may capture pictures on demand, for example, when instructed by a user, or may take pictures periodically under the control of the computer 110. Other input devices (not shown) may include a microphone, joystick, game pad, satellite dish, scanner, or the like. These and other input devices are often connected to the processing unit 120 through an input interface 160 that is coupled to the system bus, but may be connected by other interface and bus structures, such as a parallel port, game port or a universal serial bus (USB). A monitor 191 or other type of display device is also connected to the system bus 121 via an interface, such as a graphics controller 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1B. The logical connections depicted in FIG. 1B include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the input interface 160, or other appropriate mechanism. In a networked environment, program modules depicted relative to the computer 110, or portions thereof, may be stored in the remote memory storage device. By way of example, and not limitation, FIG. 1B illustrates remote application programs 185 as residing on memory device 181.

The communications connections 170, 172 allow the device to communicate with other devices. The communications connections 170, 172 are an example of communication media. The communication media typically embodies computer readable instructions, data strictures, program modules or other data in a modulated data signal such as a carrier wave or other transport mechanism and includes any information delivery media. A "modulated data signal" may be a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Computer readable media may include both storage media and communication media.

Figure 2:
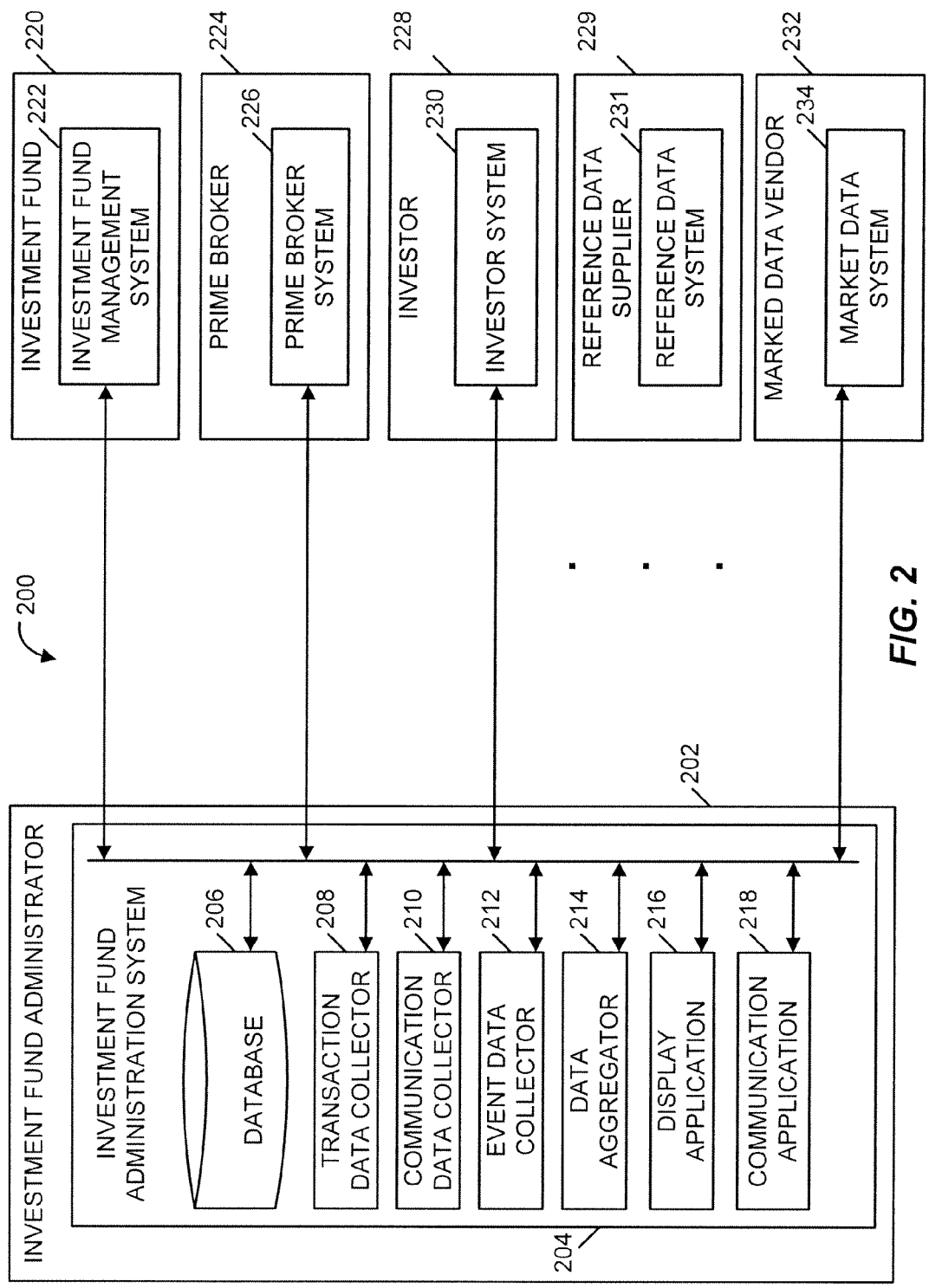
FIG. 2 illustrates an example investment fund administration environment.

FIG. 2 illustrates an example investment fund administration environment 200. The systems described in reference to FIG. 2 may be coupled to a network similar to the network 10 described in FIG. 1A. The systems described in reference to FIG. 2 may further include and/or be implemented on one or more computers similar to the computer 110 described in FIG. 1B.

The investment fund administration environment 200 may generally include an investment fund administrator 202 that uses an investment fund administration system 204 to administer one or more investment funds 220. To administer a given investment fund 220, the investment fund administration system 204 may interact with the investment fund management system 222 of the investment fund 220, e.g., to collect data regarding assets held by the investment fund 220, transactions involving the investment fund 220, and so on. The investment fund administration system 204 may further interact with prime broker systems 226 of one or more prime brokers 224, e.g., to collect data regarding prime brokers used by the investment fund 220. The investment fund administration system 204 may also interact with investor systems 230 of one or more investors 228, e.g., to collect data regarding activity of the investors associated with investment fund 220. Additionally, the investment fund administration system 204 may interact with marked data systems 234 of one or more market data vendors 232, e.g., to collect data regarding the market. Still further, the investment fund administration system 204 may interact with reference data systems 231 of one or more reference data suppliers 229, e.g., to collect reference data, such as security master data.

The investment fund administration system 204 may include a database 206 to store the data that the investment fund administration system 204 collects from various sources (e.g., investment fund management systems 222, prime broker systems 226, investor systems 230, market data systems 234, and so on). In order to collect the data, the investment fund administration system 204 may include a number of data collectors that may collect data, e.g., pertaining to assets and/or transactions of the investment fund 220 from various source (e.g., as listed above). For example, the investment fund administration system 204 may include a transaction data collector 208 to collect transaction data regarding transactions involving and investment fund 220. Such data may include different attributes of the transaction. If the transaction is a trade for instance, transaction attributes of the trade may include data regarding the assets (e.g., securities) associated with the trade, the price and quantity of these assets, information about the counterparty in the trade, and so on.

The investment fund administration system 204 may further include an event data collector 212 to collect data about events associated with different financial transactions involving the investment fund 220. For example, the event data collector may collect information about events, such as trade breaks, that prevented certain trades from clearing, rejections of trades by the counterparty and/or by the investment fund, approvals of trades by the counterparty and/or by the investment fund, and so on.

The investment fund administration system 204 may further include a communication data collector 210 to collect data about communications between different parties regarding financial transactions, assets, and so on, involving the investment fund 220. For example, the communication data collector 210 may collect data about different communications (e.g., e-mails, voicemails, instant messaging communications, etc.) that accompanied a settlement of a given trade break.

In order to aggregate all of the data collected by the different data collectors described above, the investment fund administration system 204 may include a data aggregator 214. The data aggregator 214 may be a computer system that aggregates that data to supply that data, for example, to various software routines. The various software routines may use some or all of the aggregated data, for example, to generate reports about different assets held by the investment fund 220, transactions involving the investment fund 220, and so on. For instance, in some embodiments, the investment fund administration system 204 may include, for instance, a display application 216 for displaying the data to a user. Additionally, the investment fund administration system 204 may include a communication application 218 to allow users to communicate data to other users. Details of the display application 216 and the communication application 218 are described below.

Figure 3:
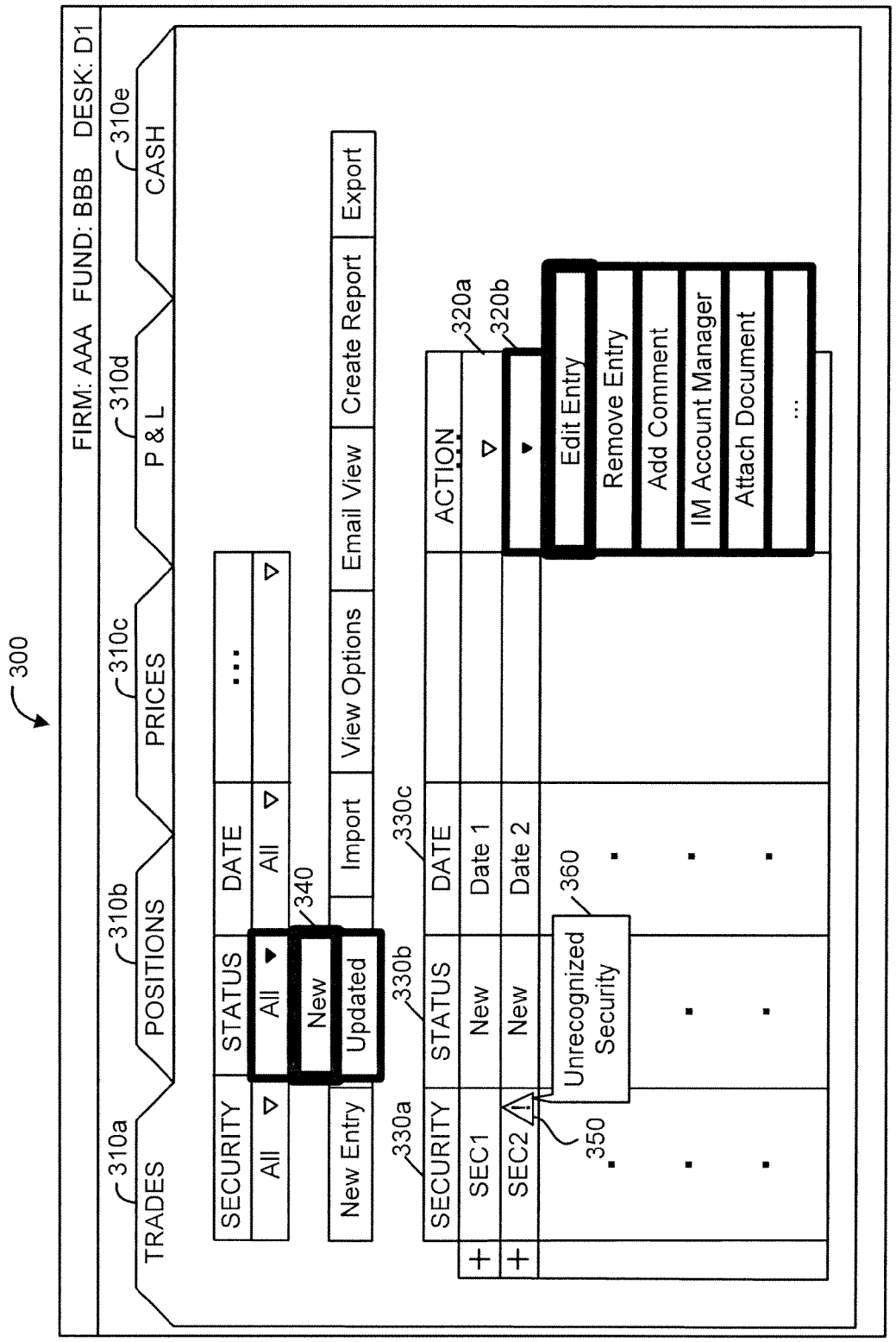
FIG. 3 illustrates an example interface embodiment for generally managing financial data.

FIG. 3 illustrates an example interface embodiment 300 for generally managing financial data. The interface embodiment 300 may be implemented, for example, on an investment fund administration system similar to the investment fund administration system 204 in FIG. 2. However, it should be understood, that the interface embodiment 300 may be implemented on other investment fund administration systems.

The interface 300 may be customized e.g., for each user, each firm, each fund, and so on. For example, a chief operations officer of an investment fund may have access to different data than may, for example, an account manager for that investment fund. The interface 300 may include one or more standardized views (e.g., blotters) 310a-310e to allow users to manage various types of financial data, including data related to different types of financial assets, data related to different parties and financial entities, and so on. For example, the interface 300 may include a trade view 310a for managing trades, a position view 310b for managing positions (e.g., of securities, portfolios, strategies, and so on), a price view 310c for managing prices, a Profit and Loss (P&L) view 310d for managing P&L statements, and a cash view 310c for managing cash accounts.

Although different views 310a-310e may include data of different types, from different sources, the views 310a-310e may be substantially standardized to provide to a user a similar look and feel across different views 310a-310e. This may generally lead to a more efficient, intuitive, and transparent user interface. For example, a user may be able to manage information of different types in the different views 310a-310e in a similar fashion, making it easier, for example, to move information from one view to another, and to generally navigate between the different views 310a-310e. Furthermore, different views 310a-310e may provide indications of problems of different types (e.g., trade breaks, invalid prices, unrecognized party names, and so on) in a similar way, making it easier for a user to identify and solve potential problems. Because the views 310a-310e may be substantially standardized, it should be understood that if a given feature is described below in reference to only one type of a view (for simplicity of explanation), that feature may be applicable to other views as well.

A given view may generally display financial data as a list of entries 320a-320b. For example, entries in a trade view 310a may include trades, entries in a position view 310b may include securities and corresponding positions (i.e., metrics indicative of the quantity of the securities), entries in a cash view 310e may include cash accounts, and so on. A given entry may include one or more fields 330a-330c that define the entry. Examples of fields 330a-330c include the security field 330a, which lists one or more securities associated with the entry; the status field 330b, which specifies the status of an entry (e.g., whether the entry is new, recently updated, outdated, and so on); one or more date fields 330c, which specify various dates associated with entry; and so on.

A given view may be configured to allow a user to edit the financial data displayed in the view. For example, a user may edit, add, remove, flag, etc. individual fields and entries. A user may also import new data into the view, e.g., from a file, a database, and so on. Likewise, a user may export data from the view, e.g., to a file, a database, etc. A user may also generate various types of reports based on the data in the view (e.g., month-end reports, daily reports, activity reports, reconciliation reports, an so on). Additionally, a user may be able to communicate, e.g., via e-mail, fax, instant messaging, etc. with other users regarding, for example, a given entry in the view and then attach the communication to that entry, as will subsequently be described in more detail. A user may further communicate data from the view to other users, e.g., via e-mail, fax, and so on. For example, a user may e-mail the view, or a portion of the view, to another user.

In some embodiments, a user may further configure the way in which data in the view is displayed. For example, a user may configure what type of data is displayed in the view. A user may further configure the general layout of the view and/or the order in which data is displayed in the view. For example, a user may configure the view to display a specific set of entries (e.g., only new entries), sorted in a particular way (e.g., by date). A user may use a number of mechanisms to configure the view, including drop-down menus (e.g., similar to a drop down menu 340 illustrated in FIG. 3), pop-up menus, dialog boxes, buttons, checkboxes, and so on.

In some embodiments, a given view may be configured to provide an indication of an issue, or a problem, associated with a given entry or a field. Examples of potential issues include outdated or invalid entries, unrecognized names, approaching or missed deadlines, and so on. An indication of an issue may be presented, for example, in the form of a visual alert indicator (e.g., an alert sign 350). The alert sign 350 may be placed appropriately at a location corresponding to the entry, or the field at issue. The alert sign 350 may be activated, for example, when a user clicks on it, places a mouse over it, and so on. If the alert sign 350 is activated, an alert message 360 may be displayed to the user, describing the nature of the issue. As an example, if for a given entry, the listed security is not recognized, an alert sign 350 may be placed next to the name of the security. If a user clicks on the alert sign 350, an alert message 360 may be displayed to the user, indicating that the name is not recognized.

In some embodiments, a view may be configured to allow a user to aggregate context associated with a given entry and attach that context to the entry. More specifically, a view may be configured to allow a user to attach supporting records to a given entry in the view. Attaching supporting records to an entry may generally improve transparency and integrity of financial data included in the entry because supporting records may provide users with background information and factual evidence related to that data. For example, supporting records may provide reasons why a given field in an entry (e.g., price of a non-liquid instrument) was changed, conversations that led to that change, parties responsible for that change, and other supporting information related to that change. Supporting records associated with an entry may include, for example, notes, comments, flags, etc. associated with the entry (e.g., added by one or more users). Supporting records associated with an entry may further include documents (e.g., contracts, policy agreements, and so on) that may be relevant to the entry. Supporting records associated with an entry may further include communications (e.g., e-mails, voicemails, instant messages, and so on) regarding that entry.

Figure 4:
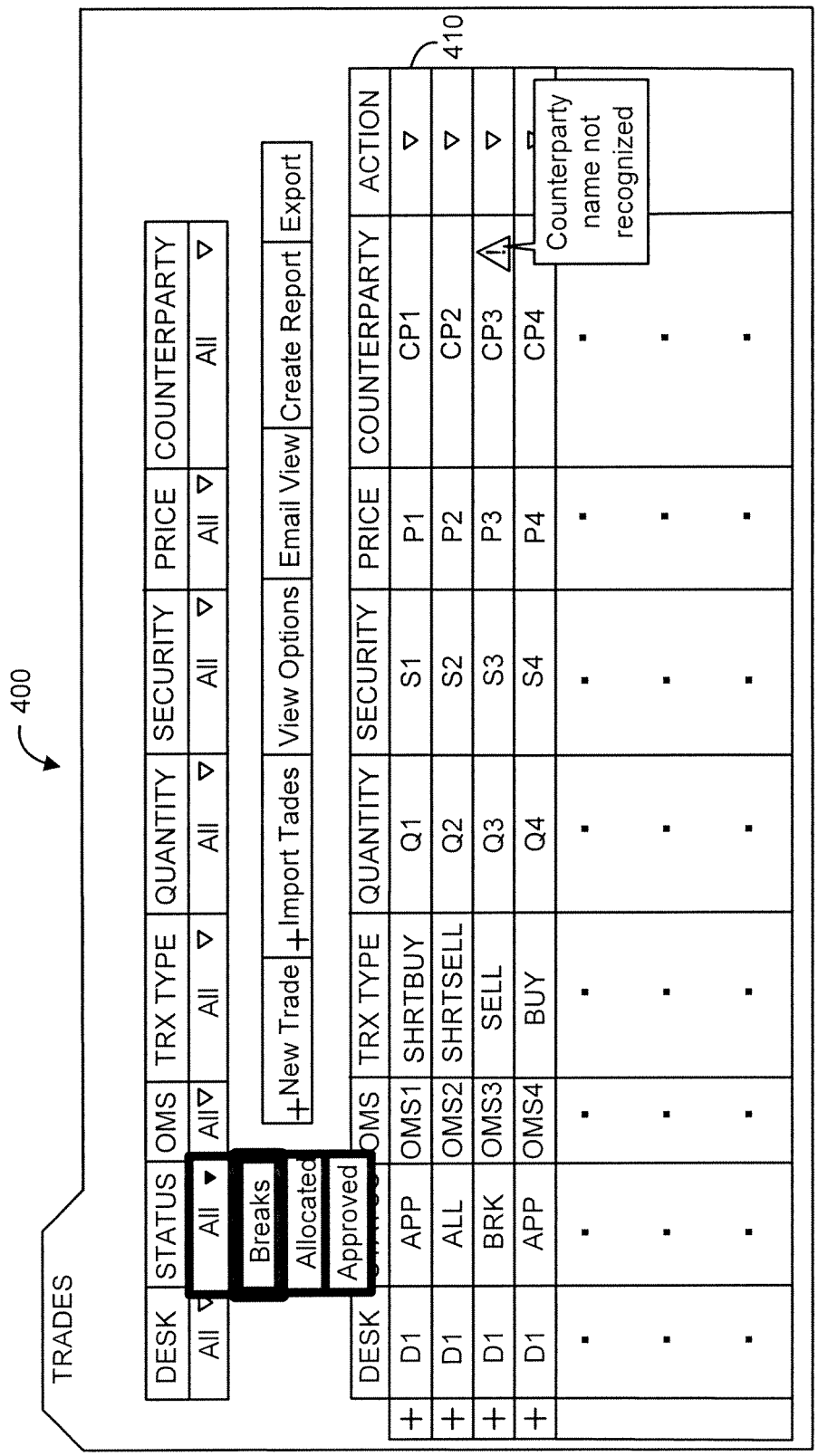
FIG. 4 illustrates an example embodiment of a trade view.
Figure 5:
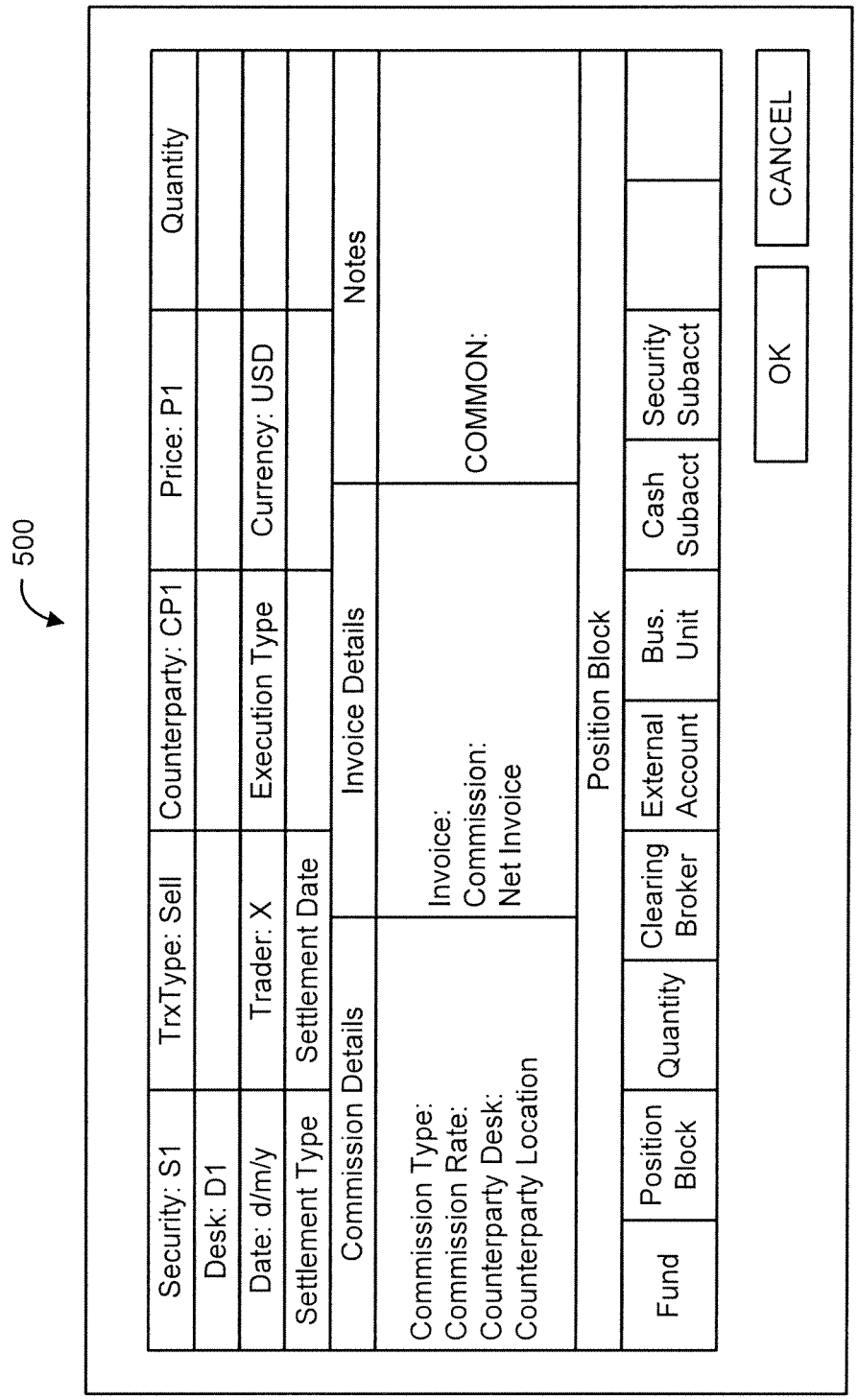
FIG. 5 illustrates an example expanded view of a trade.

FIG. 4 illustrates an example embodiment of a trade view 400. The trade view 400 may generally include a list of trades 410, e.g., for a given time period, such as a day, a month, and so on. Various information about a particular trade may be displayed in the trade view 400, including the order management system (OMS) associated with the trade 410, the status of the trade 410 (e.g., approved, completed, rejected, and so on), the type of transaction associated with the trade 410 (e.g., buy, sell, short sell, and so on), one or more securities associated with the trade 410, one or more counterparties to the trade, trade count (e.g., quantity of securities), trade date, settle date, on or more prices associated with the trade, and so on.

In order to provide more details about a given trade 410, in some embodiments, the trade view may be configured to present to a user an expanded view of the trade 410, e.g., upon demand. FIG. 4 illustrates an example expanded view 500 of a trade 410. The expanded view of the trade 410 may provide additional information to a user about the trade 410, such as the name of the trader, trade currency, settlement type and date, commission details, invoice details, information regarding one or more position blocks associated with the trade, and so on. The user may generally configure which information is provided in the expanded view, which information is provided only in expanded view, and so on.

Figure 6:
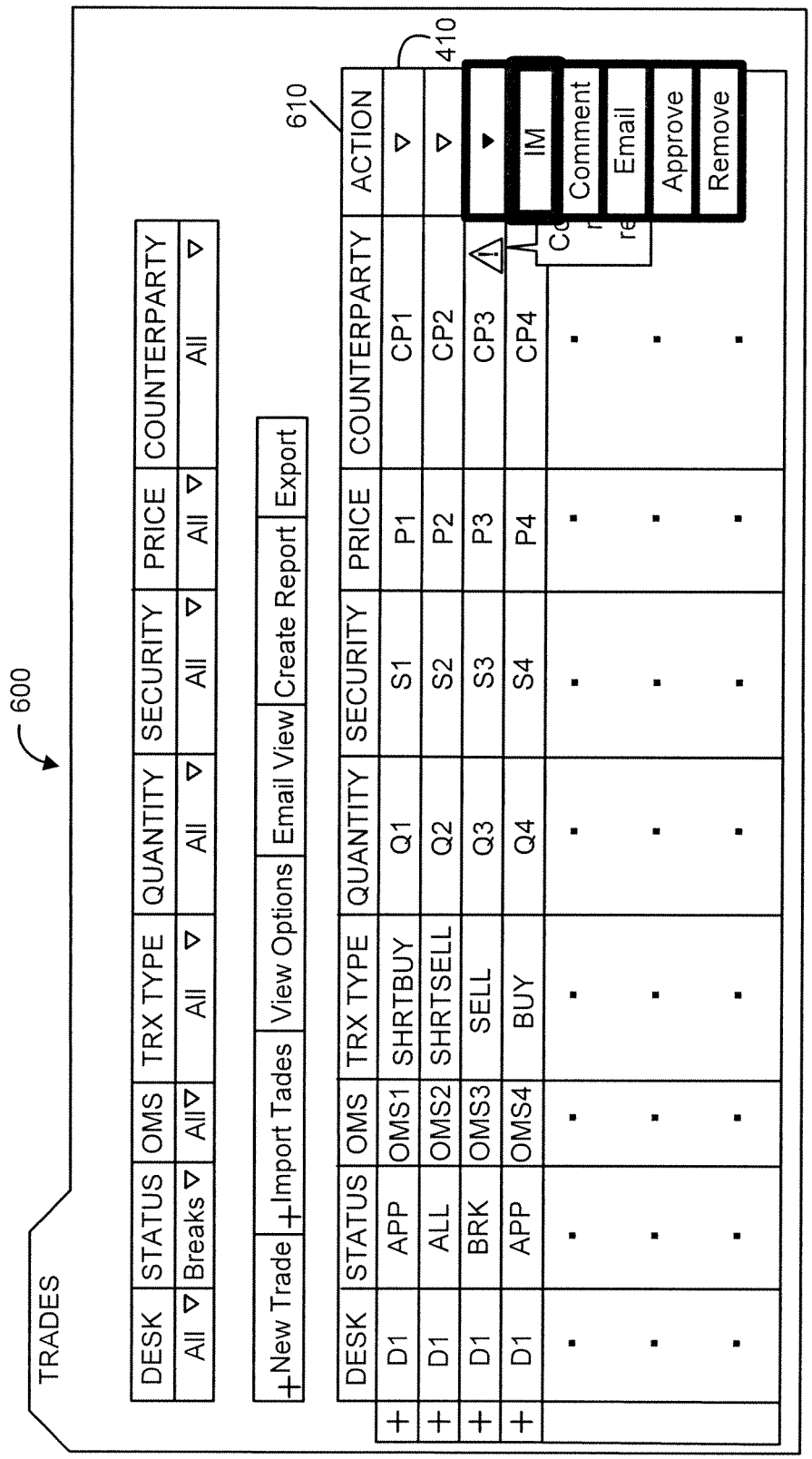
FIG. 6 illustrates another example embodiment of a trade view.

As discussed above, in some embodiments, the trade view 400 may be configured to allow a user to attach additional information to a trade. Referring to FIG. 6, for example, a user may be able to attach a comment to a trade. If a user attaches a comment to a trade, subsequent users who view the trade may be able to view that comment. For example, in order to increase transparency, a user may attach a comment explaining to apparent inconsistencies, or errors, associated with the trade. A user may use a number of mechanisms to attach a comment to a trade, for example, by selecting that trade (e.g., in a particular location, such as the column marked "ACTION" 610 in FIG. 6, or anywhere with a right mouse button click, etc.) and selecting "Comment" on a menu (e.g., a drop-down menu).

In some embodiments, a user may also attach a communication (e.g., an e-mail, a fax, a voicemail, an instant message communication, and so on) to a trade. In particular, a user may select a particular trade and initiate an instant messaging (IM) communication with another user (or several users) regarding the trade. For example, an investment fund manager may initiate an IM communication with an account manager if the investment fund manager has a question for the account manager regarding details of a particular trade.

Figure 7:
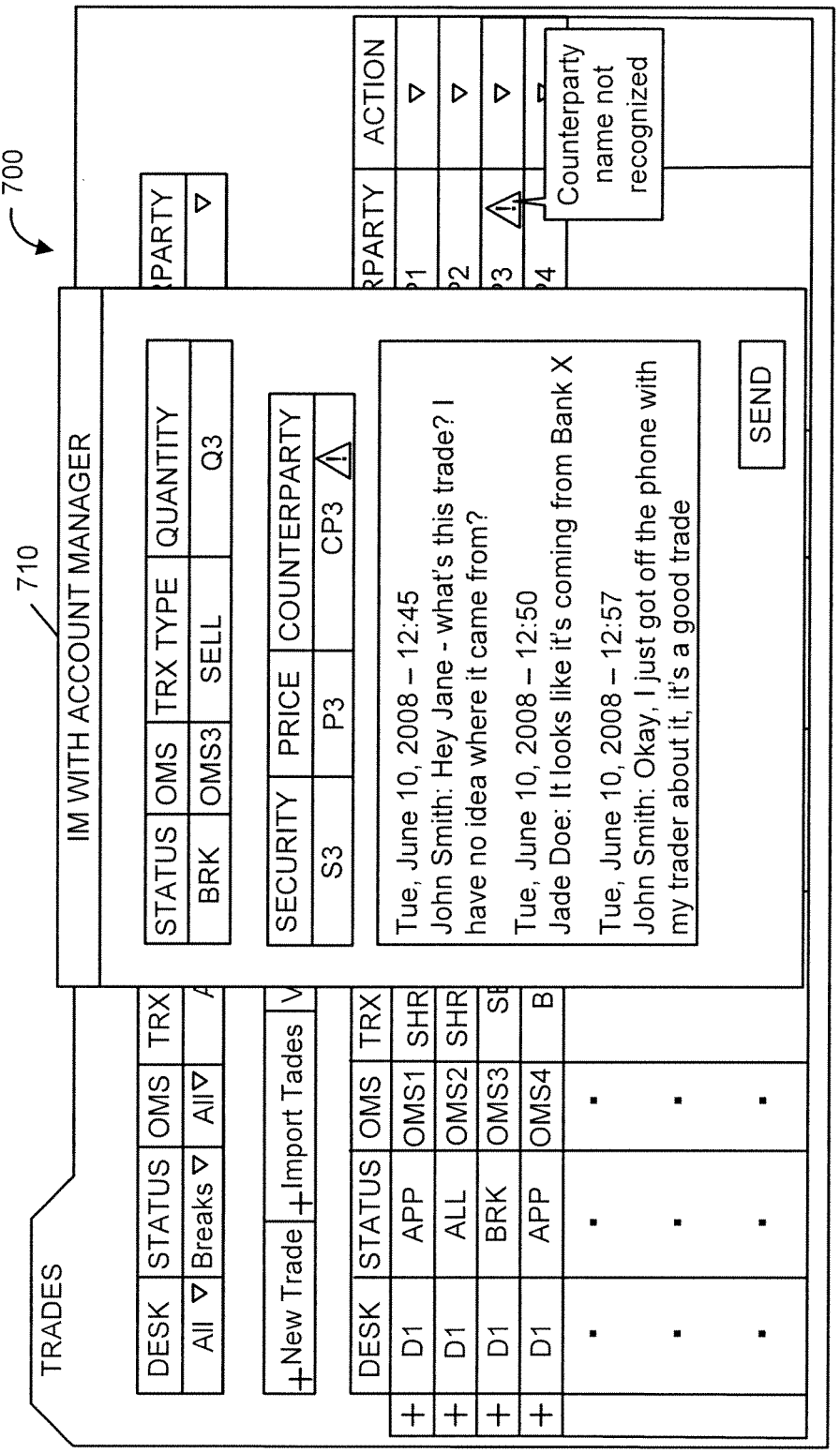
FIG. 7 illustrates an example embodiment of an instant messaging window for communication regarding trades.

Referring to FIG. 7, in some embodiments, a trade view 700 may be configured to provide a user with an IM window 710 for communicating with other users regarding a trade, for example, in response to the user's initiation of an IM communication. The IM window 710 may be a window embedded into the trade view, a pop-up window, and so on. The IM window 710 may include information about the trade (e.g., information about the trade discussed in reference to FIG. 4), so that users communicating via IM about the trade are not required to exchange that information to set the context for the communication. Furthermore, if desired, the IM window 710 may be configured to provide access to more information about the trade that is not displayed in the IM window. For example the IM window 710 may include a link to the expanded view of the trade in the trade view. Providing context for the IM communication via the IM window 710 may eliminated the need for the users participating in the conversation to establish that context. This may generally lead to quicker, shorter, and more efficient communications, as well as fewer instances of misunderstandings, human errors, and so on.

Figure 8:
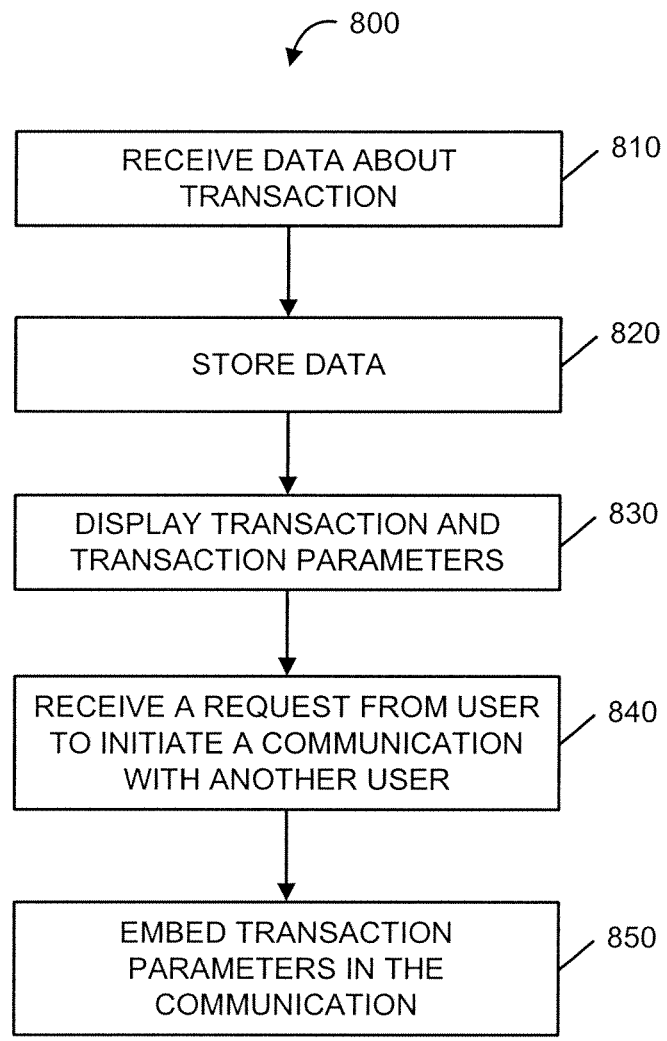
FIG. 8 illustrates an example process to allow a user to communicate with another user regarding a trade a financial transaction.

FIG. 8 is a flow chart illustrating an example process 800 to allow a user to communicate with another user (e.g., an account manager) regarding a trade, or more generally, regarding a financial transaction. The example process 800 is described with respect to the investment fund administration system 204 illustrated in FIG. 2. However, it should be understood that the example process 800 may be implemented on other investment fund administration systems.

Referring to FIG. 8, the investment fund administration system 204 may receive data pertaining to a financial transaction (block 810). The data may be received from various data sources (e.g., investment fund management system 222, prime broker system 226, investor system 230, market data system 234, and so on). The received data may be stored in the database 206 (block 820). The investment fund administration system 204 may then use the display application 218 to display the financial transaction and the parameters of the financial transaction (block 830). The transaction parameters may be based on the data received in block 810.

The investment fund administration system 204 may then use the communication application 218 to receive a request from a user to initiate a communication with another user (block 840). As explained in reference to FIG. 6, for example, the user may initiate an IM communication with an account manager via the trade view 600 with an account manager. In order to save the time usually spent on establishing the context of the communication, the context of the communication (e.g., transaction parameters) may be embedded into the communication displayed to the account manager (block 850). For example, as explained in reference to FIG. 7, transaction parameters may be embedded in the IM window 710.

In some embodiments, IM conversations, or any other communications (e-mails, voicemails, and so on) between users regarding a specific trade may be attached to the trade. For example, these conversations may be available to the users in the expanded view of the trade. As a result, other users who inquire about the same trade may be able to view the communications, e.g., in the expanded view of the trade. This leads to an increased transparency and to a general improvement in the efficiency associated with tracking trades in an organization, for example, by eliminating the typical back-and-forth (e.g., phone conversations, e-mails, and so on) associated with resolving seeming gaps or inconsistencies in information. If a user does not recognize a particular trade, for example, previous communications between other users regarding that trade (attached to the trade in the trade view 300) may help the user identify that trade, which may eliminate the need to contact these other users himself.

Figure 9:
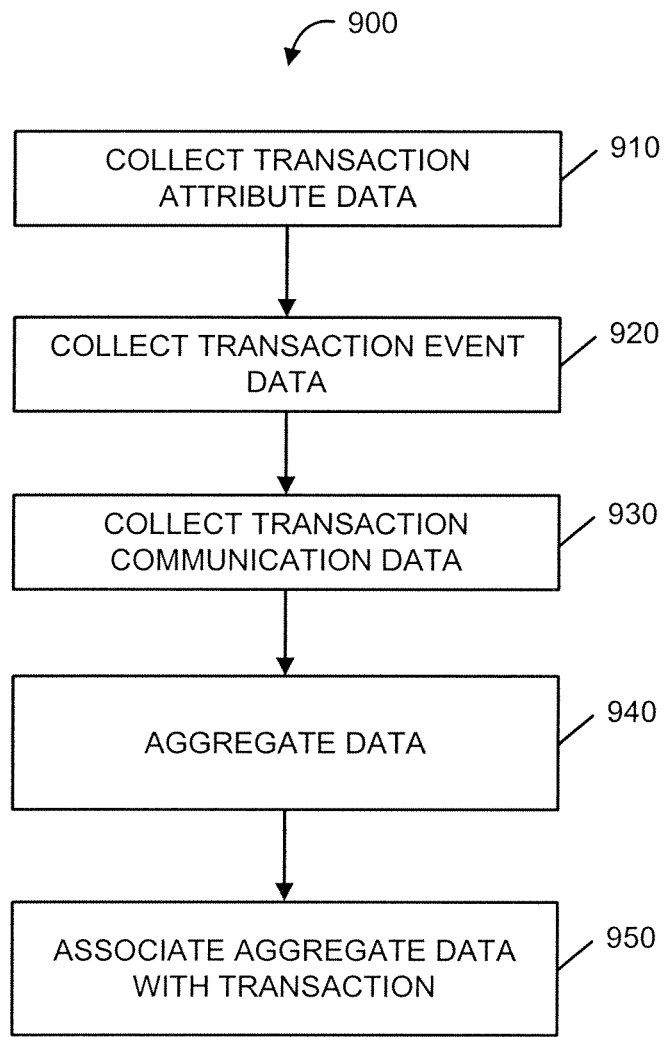
FIG. 9 illustrates an example process for attaching context to a financial transaction.

FIG. 9 is a flow chart illustrating an example process 900 for attaching communications to a trade, and, more generally, for attaching context to a financial transaction. The example process 900 is described with respect to the investment fund administration system 204 illustrated in FIG. 2. However, it should be understood that the example process 900 may be implemented on other investment fund administration systems.

Referring to FIG. 9, the investment fund administration system 204 may use the transaction data collector 208 to collect data related to attributes of a financial transaction (block 910). Attributes of a financial transaction may include, for instance, attributes of a trade discussed in reference to FIG. 4. The investment fund administration system 204 may further use the event data collector 212 to collect data indicative of events associated with the financial transaction (block 920). For example, events associated with the financial transaction may be events described in reference to FIG. 2. The investment fund administration system 204 may further use the communication data collector 218 to collect communications related to the financial transaction (block 930). Communications related to the financial transaction may include IM communications, e-mails, voicemails, and so on.

Once the data is collected, the investment fund administration system 204 may use the aggregator 214 to aggregate the data related to attributes of the financial transaction, data indicative of events associated with the financial transaction, and the communications related to the financial transaction (block 940). Furthermore, the aggregator 214 may associate the aggregated data with the transaction (block 950). Consequently, if further queries are made (e.g., at a future time) about a particular transaction, the aggregated data associated with the transaction may be, for example, displayed to the user making the query, used to generate reports, etc.

Figure 10:
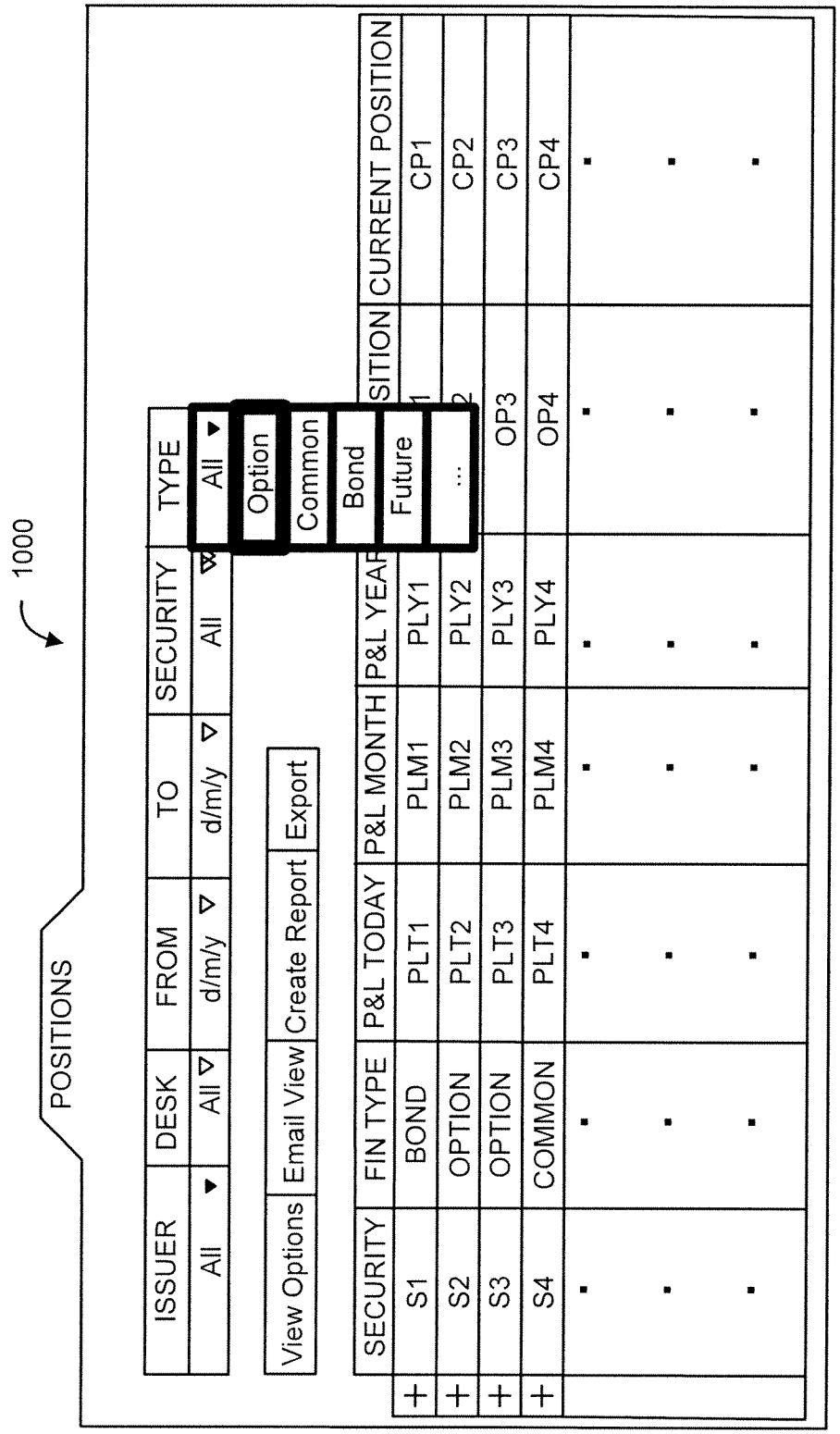
FIG. 10 illustrates an example embodiment of a position view.

FIG. 10 illustrates an example embodiment of a position view 1000. The position view 1000 may generally include a list of securities, e.g., issued by a given security-issuing entity ("issuer") and the corresponding positions on those securities. Various data related to a particular security may be displayed in the position view 1000, including the type of the security (e.g., a common stock, an option, a corporate bond, and so on), a profit and loss (P&L) statement for a day, month, year, etc., the position (e.g., open position) of the security, the date the security was issued, and so on.

Users may configure the position view 1000 to display the securities in a number of ways. For example, a user may configure the position view 1000 to display all types of securities. Additionally, or alternatively, a user may configure the position view 1000 to display only a subset e.g., one type, of securities (for example, options). Furthermore, a user may configure the position view 1000 to display securities in order of open position, current position, and so on. Therefore, in general, a user, e.g., an investment fund manager, may configure the position view 1000 to display the exposure of an investment fund to a particular entity (e.g., an issuer, a counterparty to the transaction, and so on), to a particular type of security (e.g., common stock of a given issuer), to a particular issuing time period, and so on. In other words, the user may identify the degree to which the investment fund is invested in a particular entity, a particular type of security, etc.

Additionally, or alternatively, in some embodiments, a user may configure the position view 1000 to display the exposure of a particular portfolio, a particular trading strategy, the desk or portfolio of a particular trader, etc. to a particular entity (e.g., issuer), to a particular type of security, to a particular issuing time period, and so on. For example, a user may be a trader in an investment fund. The trader may have a number of trading strategies to help him or her to make wiser investment decisions. A given strategy may be based on a number of factors, including risk tolerance, diversification of assets, volatility, and so on. A trader may be interested in determining an impact of a particular trade on specific trading strategy. To do so, the trader may access the trade at issue in the trade view 400. The trader may then select, for example, the security associated with that trade (e.g., by clicking on the security field in the entry associated with the trade) and move the security into the position view 1000 (e.g., by grabbing and dragging the security from the trade view 400 to the position view 1000). The trader may then view one or more positions of the security (e.g., open position, current position, and so on), one or more positions of other securities issued by the same issuer; one or more positions of other securities of the same time, and so on. As a result, the trader may be able to assess the impact of a particular trade on the overall exposure of the investment fund, or a particular portfolio or trading strategy within the investment fund, to different issuers, different security types, and so on.

In some embodiments, a user may configure the position view 1000 to display the exposure of an investment fund to a particular entity (e.g., an issuer, a counterparty to a transaction, and so on), or to a group of entities in a variety of other ways. For example, the user may configure the position view 1000 to display the exposure of an investment fund to particular economic sectors (e.g., energy, financials, healthcare, and so on). Moreover, within a given economic sector (e.g., technology), the position view 1000 may provide the user with the exposure of the investment fund to the various industries (e.g., software, nanotechnology, and so on). In other words, in addition to displaying to the user the exposure of an investment fund to a particular entity, or a group of entities, the position view 1000 may also display how this exposure is broken up (e.g., between different types of securities, between different economic sectors, and so on). Furthermore, the user may configure the position view 1000 to display historical and/or aggregate exposure to different entities. Still further, the user may configure the position view 1000 to display exposure associated with various risk factors (e.g., beta risk, different style factors, and so on).

Figure 11:
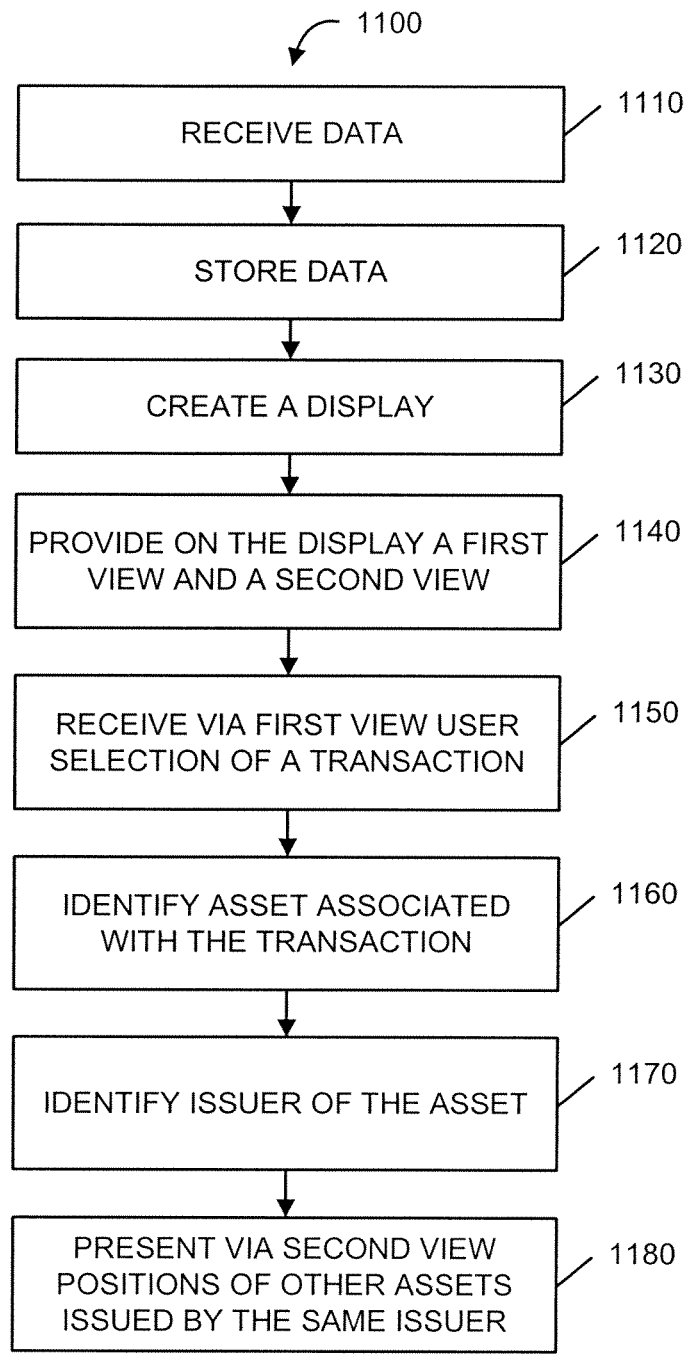
FIG. 11 illustrates an example process 1100 for allowing a user to identify exposure of the investment fund to a particular issuer.

FIG. 11 is a flow chart illustrating an example process 1100 for allowing the trader (or any user) to identify exposure of the investment fund to a particular issuer. The example process 1100 is described with respect to the investment fund administration system 204 illustrated in FIG. 2. However, it should be understood that the example process 1100 may be implemented on other investment fund administration systems.

Referring to FIG. 11, the investment fund administration system 204 may use one or more data collectors to collect data related to various financial assets held by the investment fund (block 1110). The received data may be stored in the database 206 (block 1120). The investment fund administration system 204 may then use the display application 218 to create a display for displaying the stored data (block 1130). In particular, the display application 218 may provide a first view (e.g., a trade blotter) to display a list of financial transactions related to the various financial assets held by the investment fund and a second view (e.g., a position blotter) to display positions, P&L values, etc. of these financial assets (block 1140).

Once the first and second views are provided via the display application 218, the investment fund administration system 204 may receive from a user (e.g., a trader) via the trade blotter a selection of a particular transaction (block 1150). In response, the investment fund administration system 204 may identify a particular financial asset (e.g., a security) associated with the financial transaction selected by the user (block 1160). The investment fund administration system 204 may then identify the issuer of the asset (block 1170). Once the issuer is identified, the investment fund administration system 204 may present via the second view (e.g., position blotter) the positions of other assets issued by the same issuer. Additionally, or alternatively, the investment fund administration system 204 may present via the second view other metrics associated with assets issued by the issuer (e.g., P&L values). As a result, a user may be able to identify the exposure of the investment fund to the identified issuer.

Figure 12:
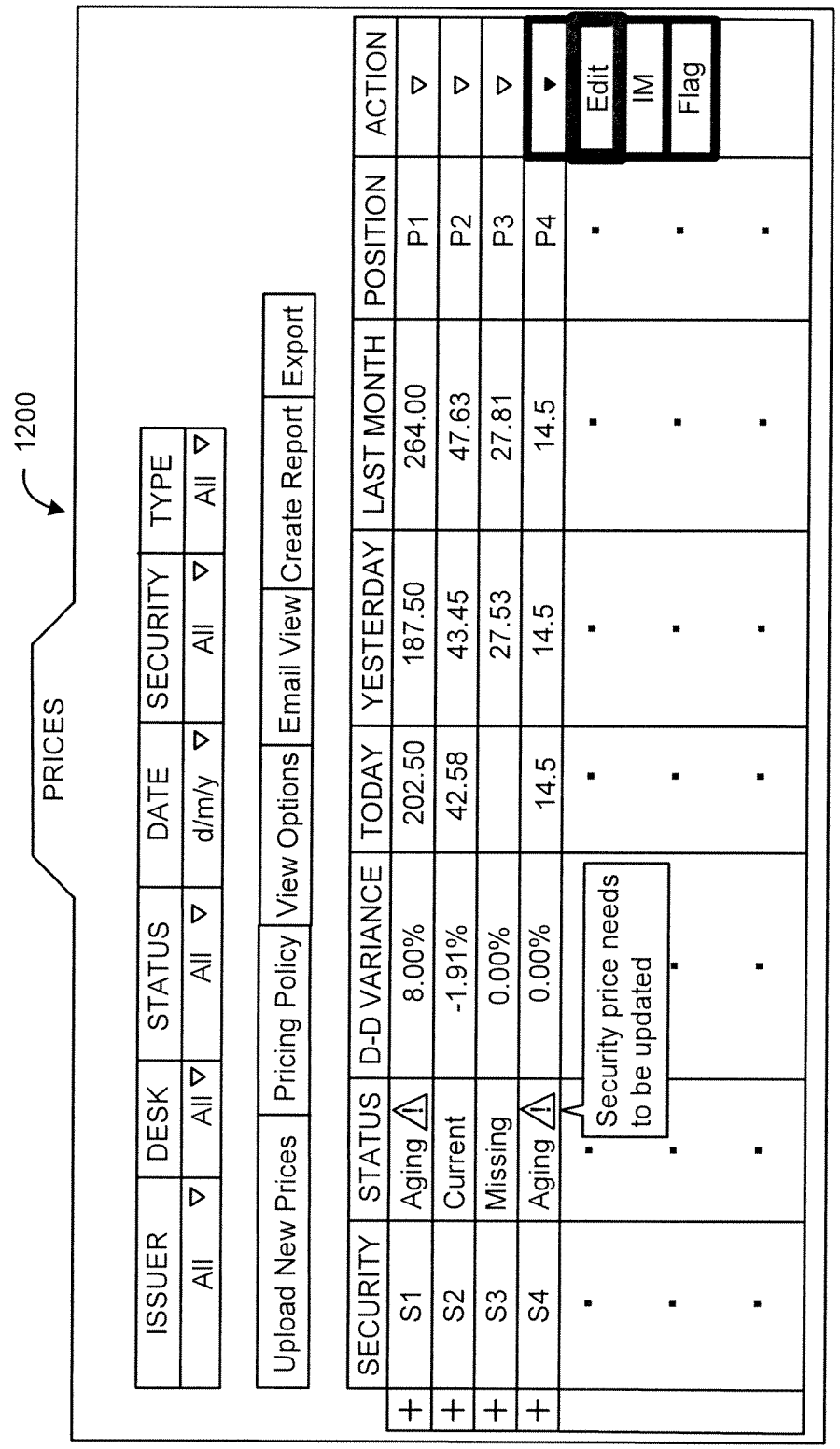
FIG. 12 illustrates an example interface embodiment of a price view.

FIG. 12 illustrates an example interface embodiment of a price view 1200. The price view 1200 may generally include a list of prices associated with different securities, e.g., owned by an investment fund. For a given security, the price view may further include the status of the price (e.g., current, missing, aging, and so on), variance in price (e.g., day-to-day variance, month-to-month variance, and so on), prices of the security at particular points in time (e.g., present price, the price a day ago, a month ago, a year ago, and so on), the position of the security, and so on. Similar to the trade view 300 and the position view 700, the price view 800 may be configured to allow users to generally edit the entries in the price view 800. For example, a user may be able to flag an entry (e.g., to remember to return to that entry at a later time, or to alert other users that there may be an issue with that entry, and so on). A user may also be able to attach various data, e.g., documents, communications such as IM communications between investment fund managers and investment fund administrators, and so on, to different entries in the price view.

In some embodiments, the price view 1200 may provide a user with access to various pricing policies related to pricing various types of securities. For example, an investment fund may have an agreement with an investment fund administrator regarding pricing common stock positions. Investment fund personnel, e.g., investment fund managers, may be able to access these agreements, e.g., via the price view, when pricing common stock positions to assign valid prices to common stock positions. Pricing policies may further reference primary sources for pricing and price validation. Pricing policies may also include details regarding the pricing processes of the investment fund administrators (e.g., as related to validation of non-liquid instruments through third-party valuators), and so on.

In some embodiments, the price view 1200 may be configured to allow users to add and/or generally edit data (e.g., prices of securities) in the price view. For example, a user may upload prices for securities, e.g., from one or more files, databases, etc. A user may upload prices, for example, by clicking the "Upload New Prices" button on the price view. In response, the user may be provided with an interface for uploading prices.

Figure 14:
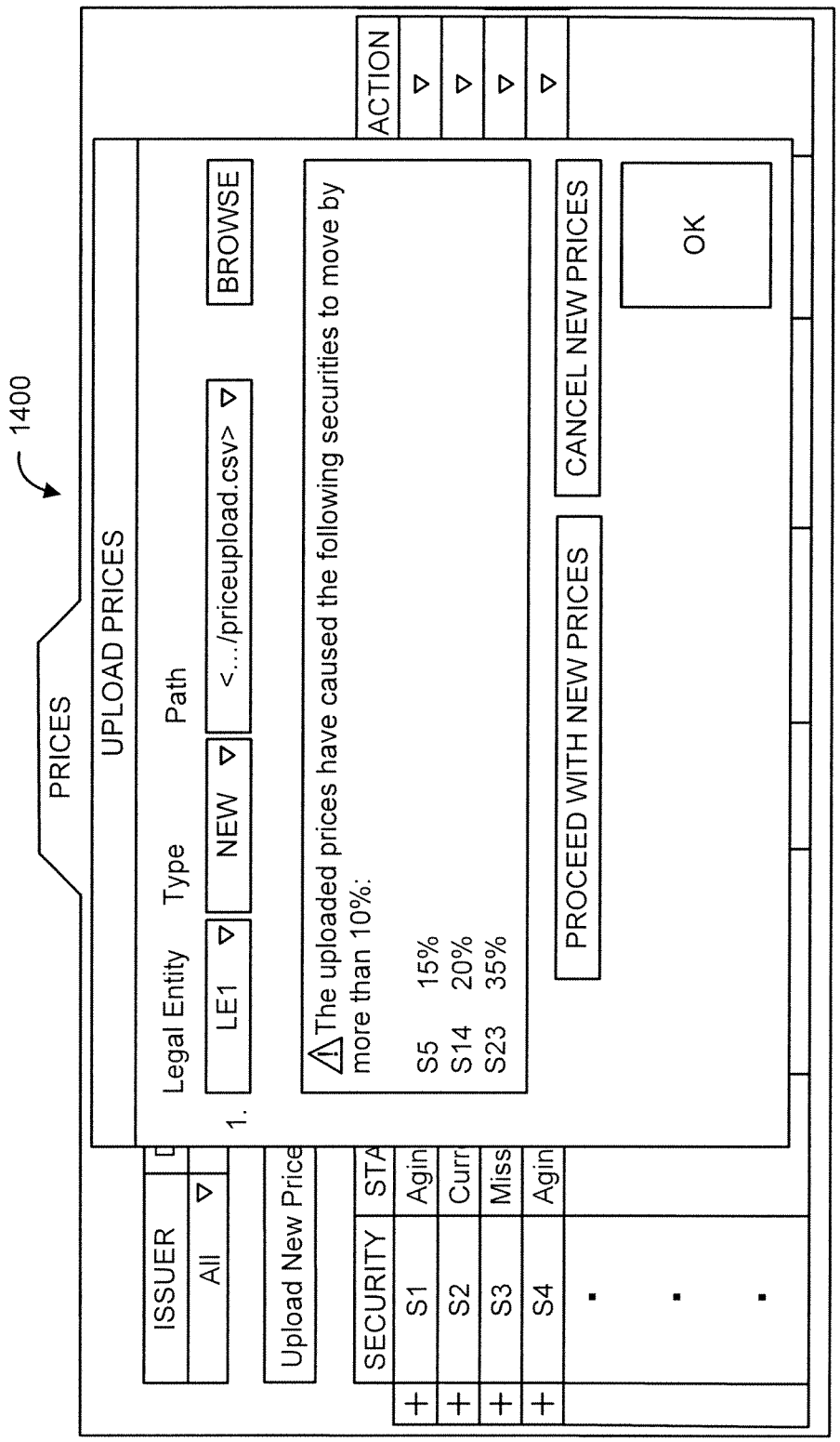
FIG. 14 illustrates another example interface embodiment for uploading prices.

FIGS. 13-14 illustrate example interface embodiments 1300 and 1400 respectively for uploading prices. Referring to FIG. 13, the interface for uploading prices 1300 generally allows a user to upload one or more prices from one or more sources (e.g., a file of comma separated values, a spreadsheet, a database, etc.) to the price view 1200. When uploading prices, a user may specify a legal entity (e.g., an investment fund) associated with those prices. The user may further specify the type of uploaded prices. For example, the uploaded prices may include new prices, updated past prices, and so on. The user may further identify one or more files (e.g., by specifying paths to those files) for which to upload the prices.

Referring to FIG. 14, in some embodiments, the interface 1400 for uploading prices may alert the user if one or more of the upload prices are invalid. Validity of an uploaded price may be determined in a number of ways. For example, an uploaded price may be determined invalid if that price causes one or more securities to move by more than a predefined amount (e.g., 10%), for example, as specified in the pricing policies available to a user, as described above. In some embodiments, if one or more uploaded prices are determined to have caused one or more securities to move by more than a predefined amount, the interface for uploading prices may provide a list of these securities to the user. The user may choose to cancel the upload of new prices. Alternatively, the user may choose to proceed with new prices, even if one or more of the prices was determined to be invalid.

Figure 15:
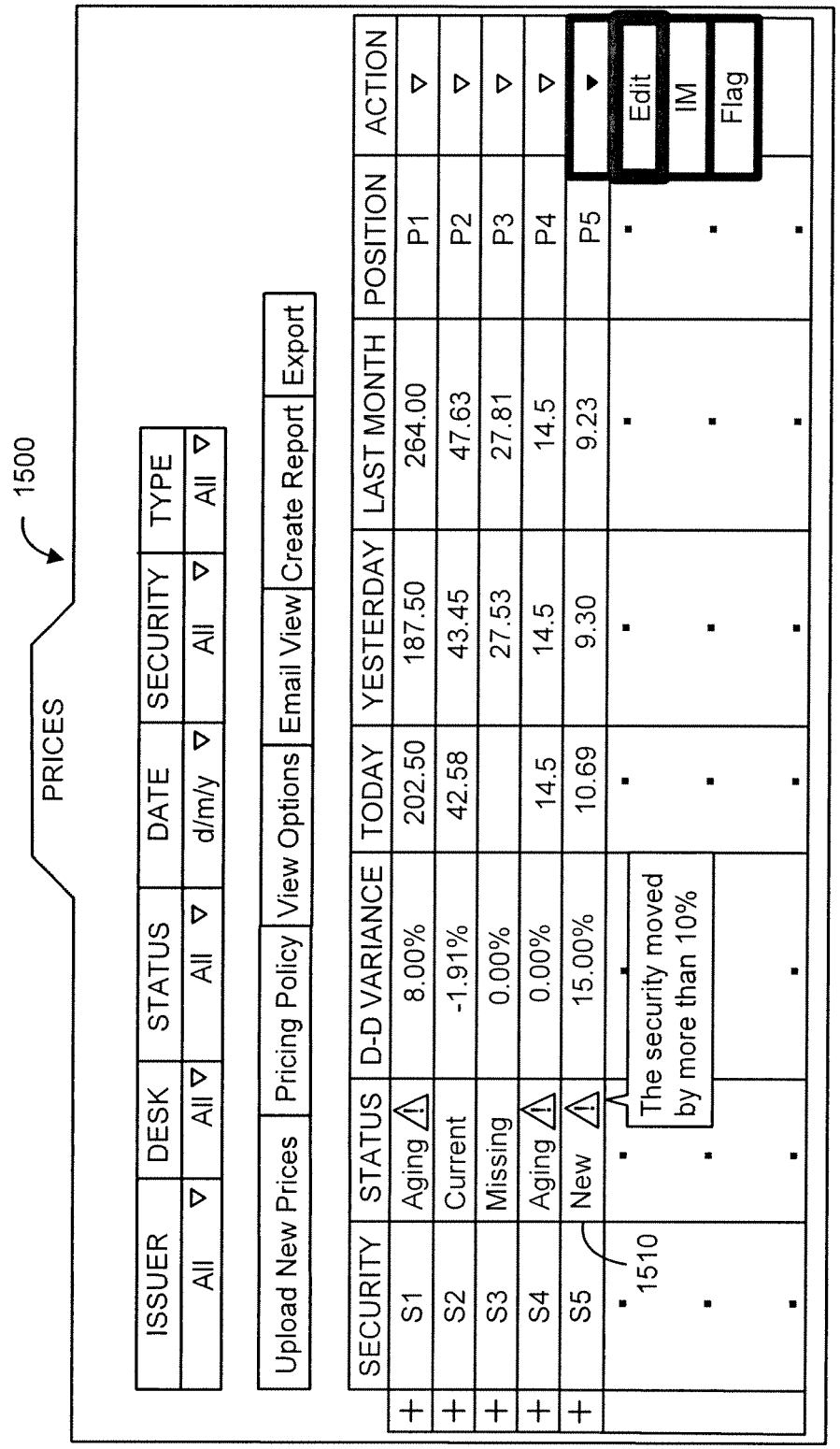
FIG. 15 illustrates another example interface embodiment of a price view.

Referring to FIG. 15, if the user chooses to proceed with uploading prices when one or more of the prices was determined to be invalid, the new price 1510 may be added to the price view 1500 with an indication (e.g., a visual alert sign, an alert message, and so on) that the price is invalid. A user may then select the entry corresponding to the security with the invalid price and edit the price to resolve the pricing issue. In some embodiments, the user may be provided with a special interface for editing a prices associated with a security.

FIG. 16 illustrates an example interface 1600 for editing the price of a security. The interface 1600 for editing a price of a security may be configured to allow a user to provide a new price for the security. The interface 1600 for editing a price of a security may further be configured to allow a user to provide supporting documentation for the new price. For example, if the security in question is a non-liquid instrument (e.g., a credit default swap), a user may provide supporting documentation describing how the price was calculated, which entity calculated the price, and so on. Providing supporting documentation regarding new prices generally improves transparency and accountability. For example, if one user changes a price of a credit default swap, supporting documentation may help another user to understand why the price was changed.

In some embodiments, the interface 1600 for editing the price of a security may further generally provide to the user details regarding the security at issue. For example, the interface 1200 for editing the price of a security may display the status of the security, the price of the security, the position of the security, the market value of the security, the source of the security, and so on. The interface 1600 for editing the price of a security may further provide the user with supporting documentation regarding the price of the security. The interface 1200 for editing a price of a security may further allow the user to view the pricing policy for that type of security. Additionally, or alternatively, the interface for editing a price of a security may include a summary of the pricing policy for that type of security.

Figure 17:
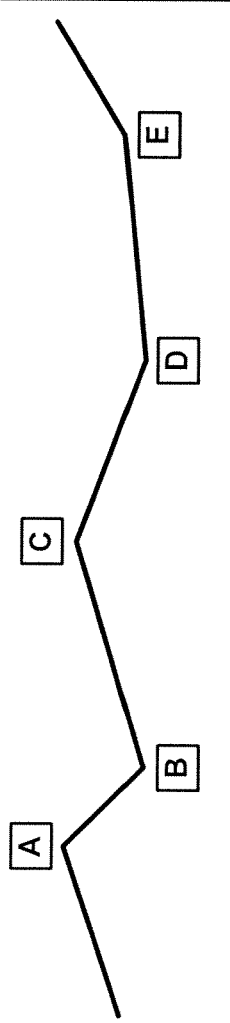
FIG. 17 illustrates an example interface embodiment for providing historical information about a security.

In some embodiments, the interface 1600 for editing a price of a security may further provide historical information to a user regarding the security. Referring to FIG. 17, historical information 1700 regarding a security may include historical prices, e.g., prices of the security at previous points in time. Historical information 1700 about a security may further include events that may have affected the price of the security (e.g., earnings announcements). Historical information 1700 may be presented to a user in a variety of formats, including for example, a table format, in a graphical form and so on.

Figure 18:
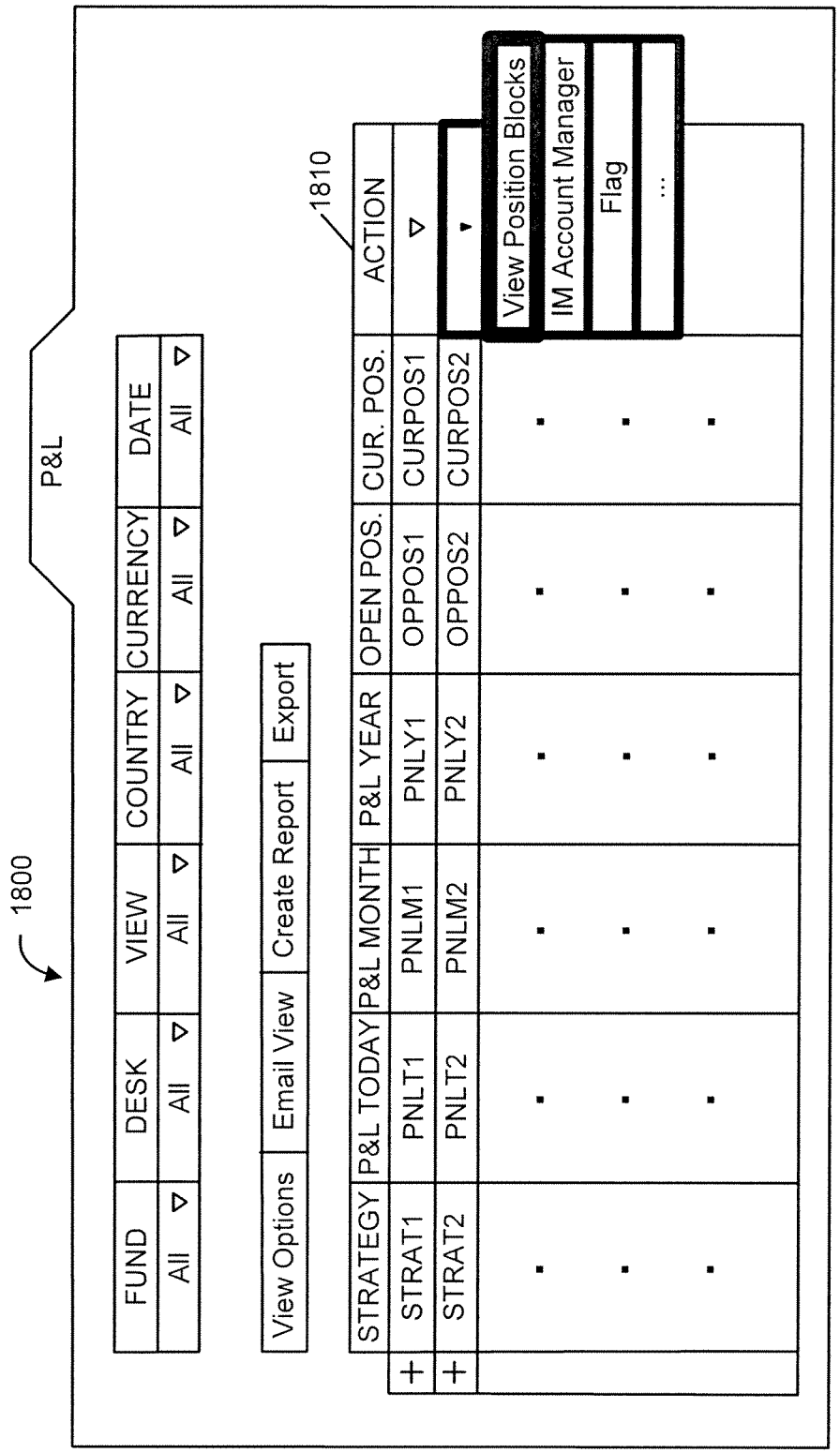
FIG. 18 illustrates an example interface embodiment of a profit-and-loss view.

FIG. 18 illustrates an example interface embodiment of a profit-and-loss (P&L) view 18400. The P&L view 1800 may generally include a list of strategies (e.g., individual securities, portfolios of securities, trading strategies, and so on) and one or more P&L values associated with those strategies. P&L values may include P&L value for the day, month, year, and so on. The P&L view 1800 may further include the position (e.g., open position) for each strategy.

In some embodiments, the P&L view may be configured to allow a user to view one or more position blocks for a given strategy. For example a user may select a strategy, e.g., by clicking on the entry corresponding to the selected strategy in the column marked "ACTION" 1810, and select "View Position Blocks" on a menu (e.g., a drop-down menu). In response, the user may be presented with a position view configured to display securities associated with the strategy and P&L statements (e.g., P&L for the day, month, and so on) and positions (e.g., open position, current position, and so on) corresponding to those securities.

FIG. 19 illustrates an example interface embodiment of a cash view 1900. The cash view 1900 may generally include a list of cash accounts (e.g., bank accounts). For each cash account, the cash view 1900 may include various information associated with the cash account. Information associated with a given cash account may include account number, the business unit associates with the account, the last statement balance, the credit, the debit, the balance, the transaction status, and so on. A cash view 1900 may be further configured to monitor activity on different accounts and provide various notifications regarding account activity to a user.

Figure 20:
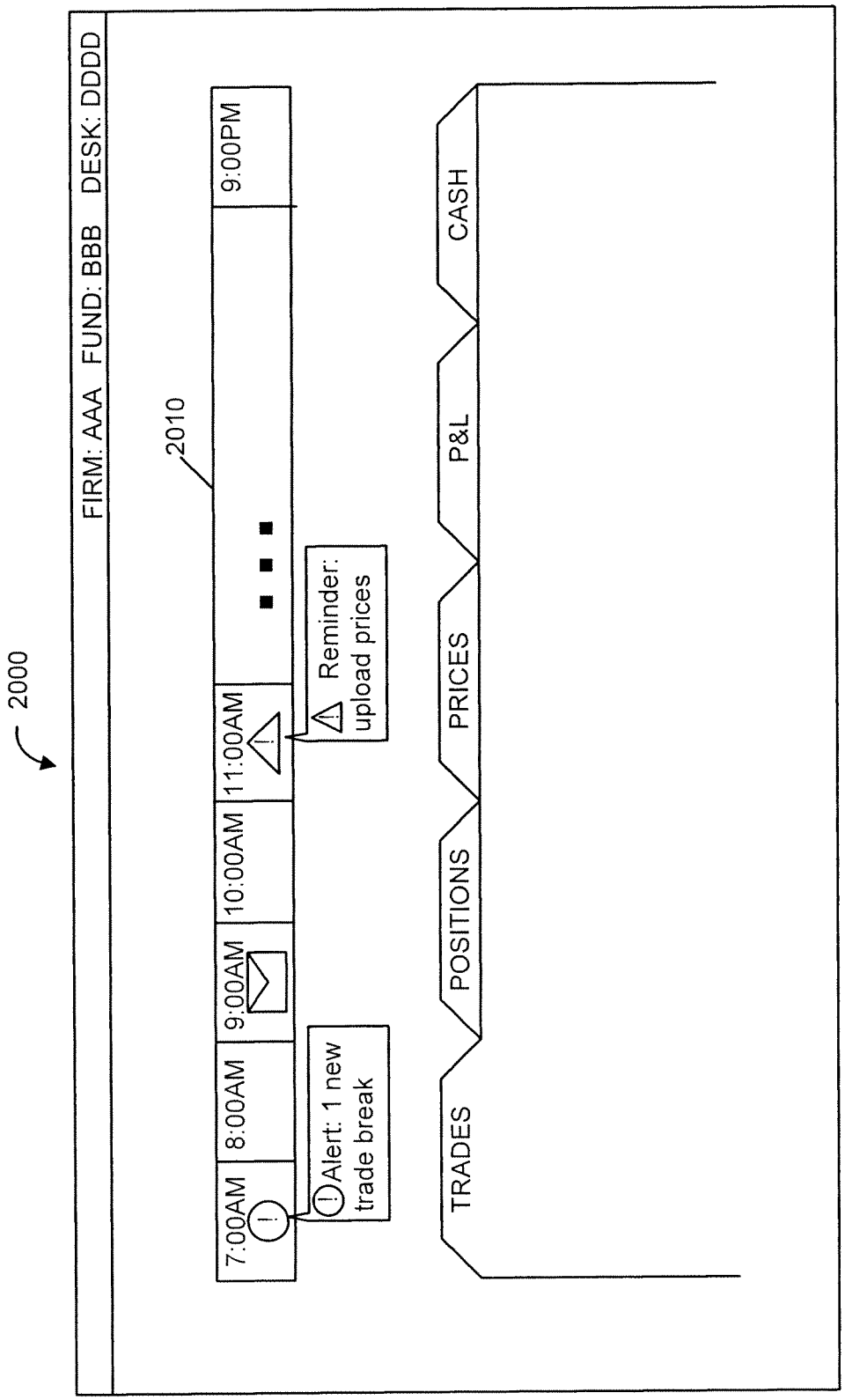
FIG. 20 illustrates an example interface embodiment for generally managing financial data, including a timeline.

Referring to FIG. 20, in some embodiments, an interface 2000 for managing financial data may include a timeline 2010. The timeline 2010 may generally depict one or more events, notifications, alerts, reminders, and so on, associated with investment fund management and administration. For example, the timeline 2010 may indicate to a user when new trade breaks have occurred. Also, the timeline 2010 may remind the user, for example, to upload trades, prices and so on by a given date and/or time. The timeline may display events over a period of a day, a week, a month, and so on.

A user may configure the timeline 2010 to include his or her own custom reminders events, notifications, alerts, reminders, and so on. A user may also configure reminders events, notifications, alerts, reminders, etc. for other users. For example, an account manager may configure the timeline 2010 of an investment fund manager to include reminders to the investment fund manager to upload all trades for the day by 5:00 PM. The timeline 2010 generally increases transparency within an organization (e.g., an investment) by keeping track of events related to investment fund management and administration.

Figure 21:
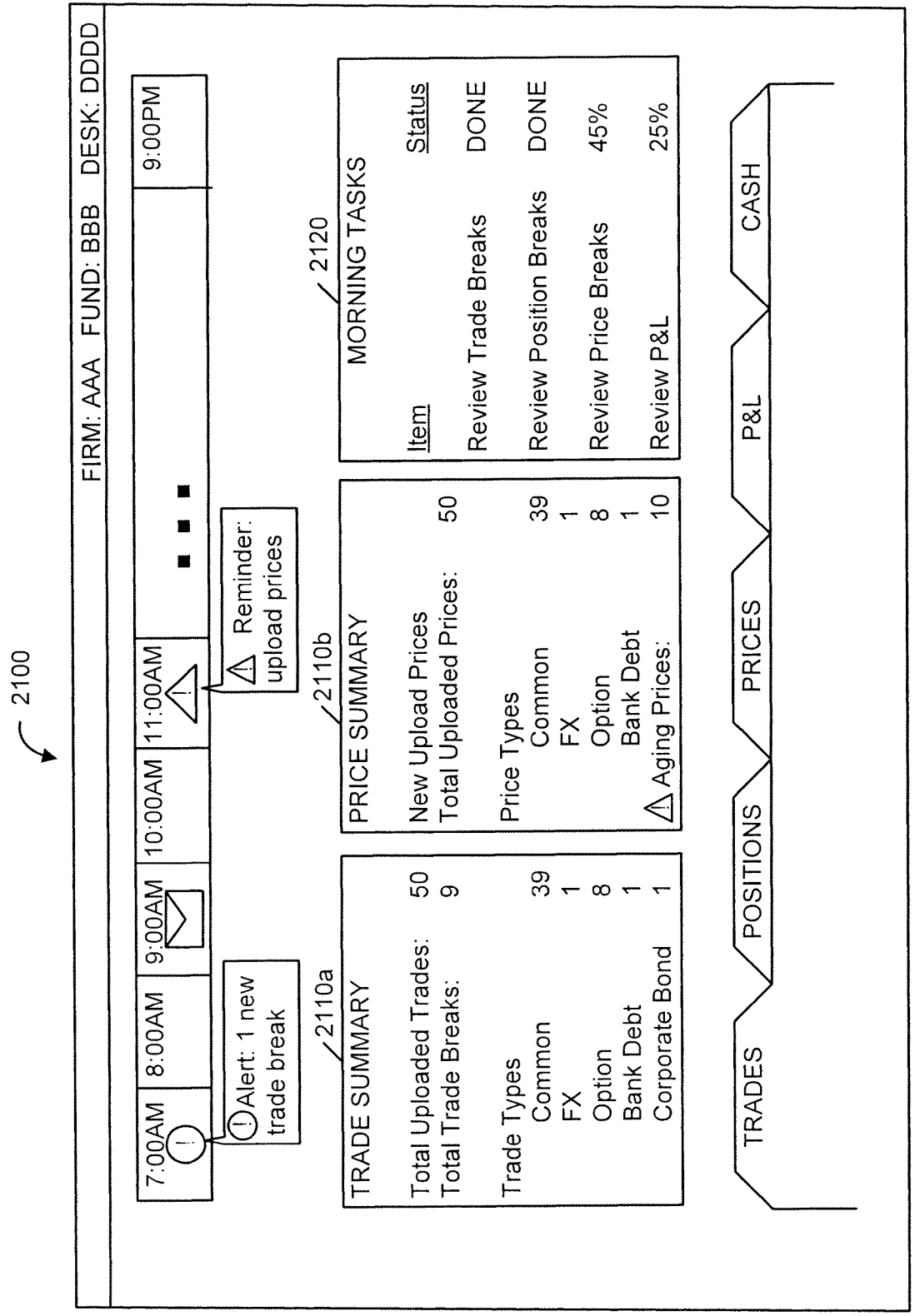
FIG. 21 illustrates an example interface embodiment for generally managing financial data, including summaries and tasks.

Referring to FIG. 21, in some embodiments, a user may configure an interface 2100 for managing financial data to include one or more financial summaries 2110a-2110b. One or more financial summaries 2110a-2110b may include, for example, a trade summary 2110a that provides summary data regarding recent trade activity. This summary data may include the number of newly upload trades, the number of trade breaks, types of trade (e.g., types of securities that are traded), and so on. One or more financial summaries 2110a-2110b may further include a price summary 2110b that provides summary data regarding recently uploaded prices. This summary data may include the number of newly upload prices, types of prices uploaded, alerts regarding prices (e.g., number of aging prices), and so on.

In some embodiments, a user may further configure the interface for managing financial data to include tasks 2120.

Tasks may be configured by a user for the user. Tasks may also be configured by a user (e.g., an account manager) for other users (e.g., investment fund managers). An example of a task 2120 illustrated in FIG. 21 is a "morning task" that presents a list of items (e.g., review trade breaks, review position breaks, review price breaks, review P&L, and so on) for a user to complete during the morning. A user may select an item and be provided with an appropriate view (e.g., a trade view to review trade breaks, a position view to review position breaks, and so on) to complete the different task items.

If other users are dependant on the completion of particular items, these users may be notified when these particular task items are completed. Users may be generally notified of events (e.g., alerts, deadlines, breaks, and so on) in a number of ways. As described above, in some embodiments, users may be notified of events via their timelines. Users may also receive notifications via pop-up windows, other general visual alerts, audible alerts, and so on. In some implementations, users may receive alerts even when they are not using the interface for managing financial data, e.g., via pop-up windows on their computers, audible alarms, e-mail, text messaging, and so on.

The invention has been described in terms of particular embodiments, but other embodiments can be implemented and are within the scope of the following claims. For example, for simplicity of explanation, management of financial data has been described with reference to investment fund management. However, it should be understood that management of financial data may be performed for other investment funds and financial institutions in general.

The invention claimed is:

1. A computer communication system operatively coupled to a plurality of data sources, each of which collects or generates financial data pertaining to a financial transaction, the computer communication system comprising:
    a database configured to store data pertaining to a trade of a particular asset between an investment fund and a counterparty, the data collected or generated by a plurality of data sources;
    a display application stored on a computer readable memory and configured to execute on a processor to create a display for displaying (i) one or more trade parameters corresponding to the trade, wherein the one or more trade parameters are based on data pertaining to the trade stored in the database, and (ii) a user-selectable communication item corresponding to the trade; and
    a communication application stored on a computer readable memory and configured to execute on a processor to create a communication interface, wherein the communication interface
        enables a first user to initiate a communication with a second user regarding the trade in response to a selection by the first user of the user-selectable communication item corresponding to the trade, wherein the communication is an e-mail communication or an instant messaging communication, and
        automatically embeds at least a portion of the one or more trade parameters in the communication displayed to the second user.

2. The computer communication system of claim 1, wherein the communication is an instant messaging communication, and wherein the communication interface enables the first user to initiate the instant messaging communication with the second user via a first instant messaging window.

3. The computer communication system of claim 2, wherein the instant messaging communication is displayed to the second user via a second instant messaging communication window.

4. The computer communication system of claim 3, wherein the communication interface embeds at least some of the one or more trade parameters in the communication displayed to the second user by embedding at least some of the one or more trade parameters in the second instant messaging window.

5. The computer communication system of claim 1, wherein the one or more trade parameters include one or more parameters selected from a group consisting of status of the trade, type of the trade, quantity of the particular asset, type of the particular asset, price of the particular asset, and the counterparty.

6. The computer communication system of claim 1, wherein the second user is an account manager for the investment fund.

7. The computer communication system of claim 1, wherein the communication interface further embeds in the communication a link to the data in the database pertaining to the trade.

8. The computer communication system of claim 1, wherein the communication application further saves the communication in the database and associates the communication with the trade.

9. The computer communication system of claim 1, wherein the communication is an e-mail communication.

10. A method of setting up a computer communication regarding a financial transaction for use in an investment fund data integration system operatively coupled to a plurality of data sources, each of which collects or generates financial data pertaining to the financial transaction, the data integration system comprising a database coupled to the plurality of data sources, a display application, and a communication application, the method comprising:
receiving from the plurality of electronic data sources financial data pertaining to a trade of a particular asset between an investment fund and a counterparty;
storing the received data in the database coupled to the plurality of data sources;
displaying (i) one or more trade parameters corresponding to the trade, and (ii) a user-selectable communication item corresponding to the trade, via a processor executing the display application, wherein the display application is stored on a computer readable memory, and wherein the one or more trade parameters are based on data pertaining to the trade stored in the database;
receiving, via the processor executing the communication application, a request from the first user to initiate a communication with a second user regarding the selected trade, wherein the request from the first user corresponds to a selection by the first user of the user-selectable communication item corresponding to the trade;
initiating, via the processor executing the communication application and in response to receiving the request from the first user, the communication between the first user and the second user regarding the selected trade, wherein the communication is an e-mail communication or an instant messaging communication; and
automatically embedding, via the processor executing the communication application, at least a portion of the one or more trade parameters in the communication displayed to the second user.

11. The method of claim 10, wherein the communication is an instant messaging communication, and wherein initiating the communication between the first user and the second user regarding the trade includes initiating an instant messaging communication with the second user via a first instant messaging window.

12. The method of claim 11, wherein the instant messaging communication is displayed to the second user via a second instant messaging communication window.

13. The method of claim 12, wherein automatically embedding at least a portion of the one or more trade parameters in the communication further includes automatically embedding at least a portion of the plurality of one or more trade parameters in the second instant messaging window.

14. The method of claim 10, wherein the one or more trade parameters include one or more parameters selected from a group consisting of status of the trade, type of the trade, quantity of the particular asset, type of the particular asset, price of the particular asset, and the counterparty.

15. The method of claim 10, wherein the second user is an account manager for the investment fund.

16. The method of claim 10, wherein automatically embedding at least a portion of the one or more trade parameters in the communication includes automatically embedding in the communication a link to the data in the database pertaining to the trade.

17. The method of claim 10, further comprising saving the communication in the database and associating the communication with the trade.

18. The method of claim 10, wherein the communication is an e-mail communication.

19. The computer communication system of claim 1, wherein the user-selectable communication item corresponding to the trade includes a menu item of a menu displayed along with the one or more trade parameters.

20. The method of claim 10, wherein the user-selectable communication item corresponding to the trade includes a menu item of a menu displayed along with the one or more trade parameters.

* * * * *